(12) United States Patent
Matsugu et al.

(10) Patent No.: US 7,007,002 B2
(45) Date of Patent: Feb. 28, 2006

(54) SIGNAL PROCESSING CIRCUIT INVOLVING LOCAL SYNCHRONOUS BEHAVIOR

(75) Inventors: Masakazu Matsugu, Chiba (JP); Katsuhiko Mori, Kanagawa (JP); Osamu Nomura, Hiroshima (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 10/153,693

(22) Filed: May 24, 2002

(65) Prior Publication Data

US 2003/0004583 A1    Jan. 2, 2003

(30) Foreign Application Priority Data

May 31, 2001  (JP)  ............................. 164284/2001
May 31, 2001  (JP)  ............................. 164284/2001

(51) Int. Cl.
  *G06N 5/00*      (2006.01)
(52) U.S. Cl. .......................................... 706/22; 706/15
(58) Field of Classification Search ................. 706/22, 706/15; 607/31; 361/313
  See application file for complete search history.

(56) References Cited

U.S. PATENT DOCUMENTS

| 4,561,443 A | * | 12/1985 | Hogrefe et al. ............... 607/31 |
| 5,208,725 A | * | 5/1993  | Akcasu ......................... 361/313 |
| 5,664,065 A |   | 9/1997  | Johnson ........................ 395/21 |
| 6,088,490 A |   | 7/2000  | Iwata et al. .................. 382/312 |
| 6,581,046 B1 | * | 6/2003  | Ahissar ....................... 706/15 |

FOREIGN PATENT DOCUMENTS

| EP | 0 413 815    | 6/1987 |
| JP | 60-000712    | 1/1985 |
| JP | 05-037317    | 2/1993 |
| JP | 07-262157    | 10/1995 |
| JP | 07-334478    | 12/1995 |
| JP | 08-2500038   | 3/1996 |
| JP | 08-153148    | 6/1996 |
| JP | 10-2741793   | 1/1998 |
| JP | 10-327054    | 12/1998 |
| JP | 11-2879670   | 1/1999 |

OTHER PUBLICATIONS

Gerstner et al., Hebbian Learning of Pulse Timing in the Barn Owl Auditory System, Pulsed Neural Networks, 1999, The MIT Press, pp. 365-366.*
J. G. Daugman, "Complete Discrete 2-D Gabor Transforms . . . Compression," IEEE Transactions on Acoustics, Speech, and Signal Processing, vol. 36, No. 7, 1169-1179 (1988).

(Continued)

*Primary Examiner*—Wilbert L. Starks, Jr.
(74) *Attorney, Agent, or Firm*—Fitzpatrick, Cella, Harper & Scinto

(57) ABSTRACT

A local synchronization type parallel pulse signal processing circuit has a plurality of neurons connected to each other based on a predetermined rule and disposed in parallel, executing a predetermined arithmetic process with respect to input signals and outputting, a phase synchronization signal generation circuit outputting phase synchronization signals to the predetermined vicinal neurons, and a synchronization detection portion detecting synchronization within an allowable phase difference between the outputs of the predetermined vicinal neurons. The phase synchronization signal generation circuit functions also as a neuron executing the predetermined arithmetic process and outputting in accordance with a result of the synchronization detection by the synchronization detection portion. With this architecture, the synchronization circuit operating stably without any contradiction in a way that brings neither an increase in circuit scale nor an increase in consumption of electric power, is actualized.

13 Claims, 16 Drawing Sheets

OTHER PUBLICATIONS

LeCun et al., "Convolutional Networks for Images, Speech, and Time Series," The Handbook of Brain Theory and Neural Networks (M. Arbib, Ed.) 255-258 (1995).

Seibert et al., "Learning and Recognizing . . . Neural System," Neural Networks for Perception, vol. 1, 426-444 (1992).

Anderson et al., "Routing Networks in Visual Cortex," The Handbook of Brain Theory and Neural Networks (M. Arbib, Ed.) 823-826 (1995).

Lazzaro et al., "Silicon Auditory Processors as Computer Peripherals," Advances in Neural Information Processing Systems 5, 820-827 (1993).

Sirovich et al., "Low-Dimensional Procedure for the Characterization of Human Faces," J. Opt. Soc. Am. A, vol. 4, No. 3, 519-524 (1987).

Murray et al., "Pulse-Stream VLSI . . . Digital Techniques," IEEE Transactions on Neural Networks, vol. 2, 193-204 (1991).

Lades et al., "Distortion invariant Object . . . Architecture," IEEE Transactions on Computers, vol. 42, No. 3, 300-311 (1993).

Broussard et al., "Physiologically Motivated Image Fusion . . . Neural Network," IEEE Transactions on Neural Networks, vol. 10, No. 3, 554-563 (1999).

Fukushima et al., "Neocognitron: A New Algorithm for Pattern . . . Position," Pattern Recognition, vol. 15, No. 6, 455-469 (1982).

Eckhorn, "Feature Linking via Synchronization . . . Cortex," Neural Computation, vol. 2, 293-307 (1990).

Schuster et al., "Asynchronous Interlocked Pipelined CMOS Circuits Operation at 3.3-4.5 Ghz," IEEE ISSC Digest of Technical Papers, vol. 43 (2000).

* cited by examiner

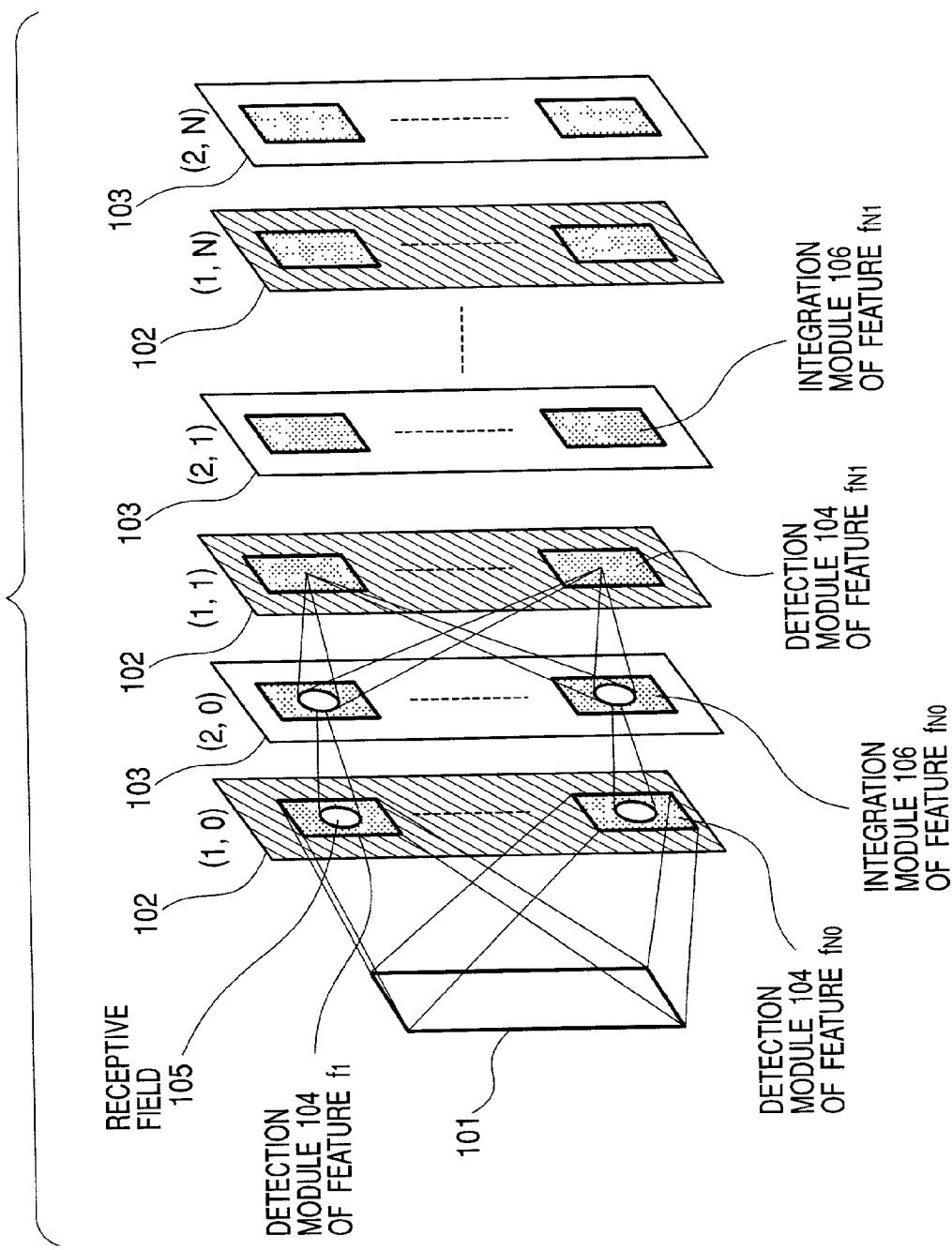

SIGNAL PROCESSING CIRCUIT INVOLVING LOCAL SYNCHRONOUS BEHAVIOR

BACKGROUND OF THE INVENTION

1. Field of the Invention

The present invention relates to a signal processing circuit such as a neural network etc for implementing a parallel pulse signal process involving a local synchronous behavior.

2. Related Background Art

Image and voice recognition implementation systems have hitherto been roughly classified into such a type that a recognition processing algorithm specialized for a specified recognition object is sequentially operated and executed as computer software, and a type in which the same algorithm is executed by a dedicated parallel image processor (such as an SIMD (Single Instruction Multiple Data) processor, an MIMD (Multiple Instruction stream/Multiple Data stream) processor and so on).

Typical examples are given below as exemplifying the image recognition algorithm. At first, the following is methods involving calculating a feature amount relative to a similarity to a recognition object model. One method is a method for representing recognition object model data as a template model, calculating a similarity by template matching etc with an input image (or a feature vector thereof) and calculating a high-order correlation coefficient. Another method is a method (Sirovich, et al., 1987, Low-dimensional procedure for the characterization of human faces, J. Opt. Soc. Am. (A), vol. 3, pp. 519–524) for mapping an input pattern to an intrinsic image function space obtained by analyzing primary components of an object model image, and calculating an intra-feature-space distance from the model. A further method is a method (Lades et al., 1993, Distortion Invariant Object Recognition in the Dynamic Link Architecture, IEE Trans. on Computers, vol. 42, pp. 300–311) for representing a plurality of feature extraction results (feature vectors) and a spatial arrangement relationship as graphs, and calculating a similarity based on elastic graph matching. A still further method is a method (Seibert, et al., 1992, Learning and recognizing 3D objects from multiple views in a neural system, in Neural Networks for Perception, vol. 1 Human and Machine Perception (H. Wechsler Ed.) Academic Press, pp. 427–444) for obtaining position-, rotation- and scale-invariable representations by executing predetermined conversions with respect to input images and thereafter collating with a model.

The following is exemplifications of a pattern recognition method based on a neural network model of which a hint is acquired from a biological information processing system. One exemplification is a method (Japanese Patent Post-Exam. No. 60-712, Fukushima & Miyake, 1982, Neocognitron: A new algorithm for pattern recognition tolerant of deformation and shifts in position, Pattern Recognition, vol. 15, pp-455–469) for implementing hierarchical template matching. Another exemplification is a method (Anderson, et al., 1995, Routing Networks in Visual Cortex, in Handbook of Brain Theory and Neural Networks (M. Arbib, Ed.), MIT Press, pp. 823–826) for obtaining object-based scale- and position-invariable representations by dynamic routing neural networks. Other exemplifications are methods using multi-layer perceptrons, a radial basis function network and so on.

On the other hand, what is proposed as a scheme for taking an information processing system based on biological neural networks with a higher fidelity, is a neural network model circuit (Murray et al., 1991, Pulse-Stream VLSI Neural Networks Mixing analog and digital Techniques, IEEE Trans. on Neural Networks, vol. 1.2, pp. 193–204,; Japanese Patent Application Laid-Open Nos. 7-262157, 7-334478 and 8-153148, and Japanese Patent Publication No. 2,879,670) for transmitting and representing information through on a pulse train corresponding to an action potential.

Methods for recognizing and detecting a specified object by a neural network constructed of pulse train generation neurons, are systems (U.S. Pat. No. 5,664,065, and Broussard, et al., 1999, Physiologically Motivated Image Fusion for Object Detection using a Pulse Coupled Neural Network, IEEE Trans. on Neural Networks, vol. 10, pp. 554–563, and so forth) using a pulse coupled neural network (which will hereinafter be abbreviated to PCNN), to be specific, a high-order (second-order or higher) model by Echhorn (Eckhorn, et al., 1990, Feature linking via synchronization among distributed assembles: simulation of results from cat cortex, Neural Computation, vol. 2, pp. 293–307) which is based on the premise of linking inputs and feeding inputs.

Further, a method for relieving a wiring problem in the neural network is an event-driven oriented method (Address Event Representation: this will hereinafter be abbreviated to AER) (Lazzaro, et al., 1993, silicon Auditory Processors as Computer Peripherals, In Touretzky, D (ed), Advances in Neural Information Processing Systems 5. San Mateo, Calif.: Morgan Kaufmann Publishers) for coding addresses of so-called pulse output neurons. In this case, IDs of pulse train output-sided neurons are coded as binary addresses, whereby even when output signals from the different neurons are arranged in time sequence on a common bus, the input-sided neurons are able to automatically decode the addresses of the source neurons.

On the other hand, the neural network processor related to U.S. Pat. No. 2,741,793 schemes to reduce the number of neurons and to downsize a circuit by configuring multi-layered feedforward oriented networks in a systolic array architecture.

According to the parallel processing multiprocessors system etc related to Japanese Patent Publication No. 2,500,038, an existence or non-existence of error is detected based on a decision-by-majority process of signatures generated simultaneously with a process of an instruction set in a distributed parallel type computing system.

Moreover, the operation frequency of the microprocessors have shown sharp increases over the recent years. Under this condition, there is developed an architecture (Schuster, S. et al., "Asynchronous Interlocked Pipelined CMOS Circuits operating at 3.3–4.5 GHz", 2000, IEEE International solid-state circuits conference (ISSCC2000), WA17.3, vol. 43, pp. 292–293, 2000) in which the whole chip is not operated in synchronization with the single clock signal, and the chip is divided into a plurality of blocks and these blocks are operated asynchronously.

The prior arts described above are required to use global clock signals as control clock signals for taking synchronism of arithmetic elements, and to use local clock signals as control clock signals for forming a synchronization cluster for performing a local behavior.

This architecture brings about increases both in circuit scale and in consumption of electric power, and is difficult to actualize a synchronization circuit operating stably without any contradiction.

SUMMARY OF THE INVENTION

It is therefore a primary object of the present invention to stably implement a local synchronous behavior in parallel pulse signal processing without any contradiction owing to a function of outputting a phase synchronization signal having such a signal level that a phase difference between output signals of arithmetic elements falls within an allowable phase difference, to the arithmetic elements from a phase synchronization signal generation circuit, in accordance with outputs of the arithmetic elements of which the outputs are a target for phase synchronization, and also to actualize a low consumption of electric power.

It is another object of the present invention that the same element actualizes a function of the phase synchronization signal generation circuit and a function of an arithmetic element performing a predetermined arithmetic process and outputting by switching over a topology of the circuit in accordance with a result of synchronization detection by a synchronization detection portion, and that a circuit scale is reduced.

According to one aspect, the present invention which achieves these objectives relates to a signal processing circuit comprising a plurality of arithmetic elements connected to each other based on a predetermined rule and disposed in parallel, executing a predetermined arithmetic process with respect to input signals and outputting, a phase synchronization signal generation circuit outputting phase synchronization signals to the predetermined vicinal arithmetic elements, and a synchronization detection portion detecting synchronization within an allowable phase difference between the outputs of the predetermined vicinal arithmetic elements, wherein the phase synchronization signal generation circuit functions also as an arithmetic element executing the predetermined arithmetic process and outputting in accordance with a result of the synchronization detection by the synchronization detection portion.

According to another aspect, the present invention which achieves these objectives relates to a signal processing circuit comprising a plurality of arithmetic elements connected to each other based on a predetermined rule and disposed in parallel, executing a predetermined arithmetic process with respect to input signals and outputting, a phase synchronization signal generation circuit outputting phase synchronization signals to the predetermined vicinal arithmetic elements, and a synchronization detection portion detecting synchronization within an allowable phase difference between the outputs of the predetermined vicinal arithmetic elements, wherein the output of each of the phase synchronization signals outputted to the predetermined vicinal arithmetic elements from the phase synchronization signal generation circuit, is so controlled as to fall within the allowable phase difference between the output signals from the predetermined vicinal arithmetic elements.

Other objectives and advantages besides those discussed above shall be apparent to those skilled in the art from the description of a preferred embodiment of the invention which follows. In the description, reference is made to accompanying drawings, which form a part thereof, and which illustrates an example of the invention. such example, however, is not exhaustive of the various embodiments of the invention, and therefore reference is made to the claims which follow the description for determining the scope of the invention.

BRIEF DESCRIPTION OF THE DRAWINGS

FIG. 1 is a diagram showing a whole architecture of a network according to the present invention;

DESCRIPTION OF THE PREFERRED EMBODIMENTS

Figure 2A:
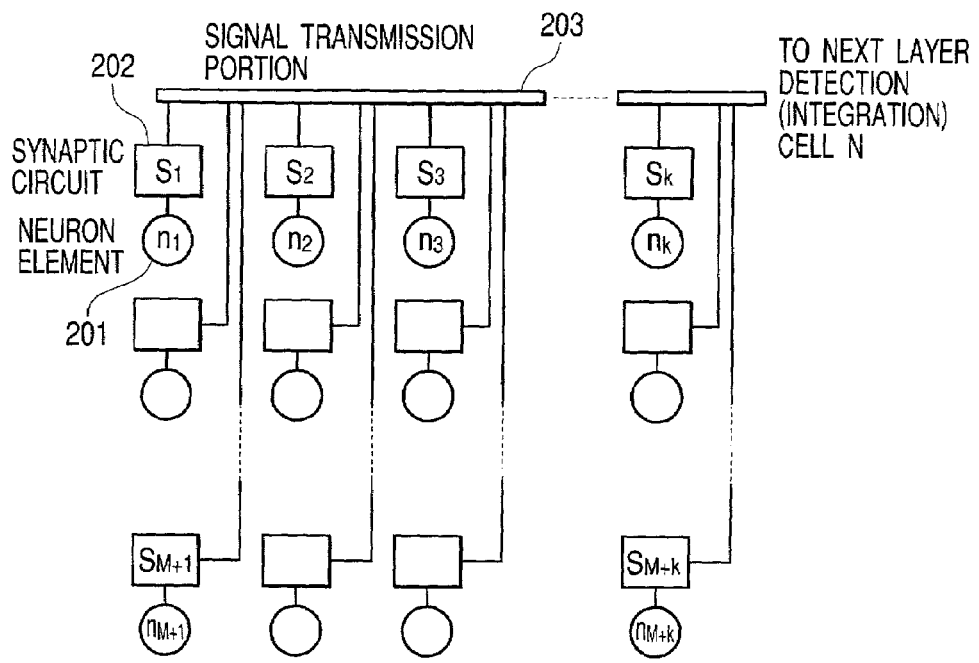
FIGS. 2A, 2B and 2C are diagrams showing configurations of a synaptic portion and a neuron element portion, and a circuit architecture of neuron elements.

Preferred embodiments of the present invention will hereinafter be described in detail with reference to the accompanying drawings.

(First Embodiment)

The discussion in a first embodiment is focused on a neural network model, of which a hint is acquired from a biological information processing system, as a local synchronous signal processing circuit.

According to the present invention, however, entire functions and operations of a pulse signal processing circuit are not particularly limited. The present invention may include, if capable of transmitting the information in a way that forms a local synchronous cluster as will be mentioned later on, signal processing circuits having other architectures and functions.

Accordingly, a pattern recognition system that will hereinafter be discussed is, it should be noted, merely one exemplification for explaining the present invention to the end.

Outline of Whole Architecture

FIG. 1 is a diagram showing a whole architecture of a network for a pattern detection/recognition system in the first embodiment. This pattern detection/recognition system mainly deals with information related to a recognition (detection) of an object or a geometrical feature.

Referring to FIG. 1, the system has a so-called convolutional network architecture (LeCun, Y. and Bengio, Y., 1995, "Convolutional Networks for Images Speed, and Time Series" in Handbook of Brain Theory and Neural Networks (M. Arbib, Ed.), MIT Press, pp. 255–258). A final output is defined as a result of the recognition, i.e., a category of the object recognized.

A data input layer 1 is a CMOS (Complementary Metal-Oxide Semiconductor) sensor or a photoelectric converting device such as a CCD (Charge Coupled Device) in the case of detecting and recognizing an image, and a voice input sensor in the case of detecting and recognizing a voice. Further, the data input layer 1 may be structured to input high-order data obtained from a result of analysis (for example, a primary component analysis, vector quantization and so on) by a predetermined data analyzing portion.

Given hereinafter is an explanation of the case of inputting the image. A feature detection layer (1, 0) detects, based on a multiple resolution process such as Gabor wavelet conversion and others, a local low-order feature (that may contain a color component feature in addition to the geometrical feature) of an image patter by the number of a plurality of feature categories at a plurality of scale levels or with a plurality of resolutions at the same area in each of positions over the entire image surface (or at each of predetermined sampling points over the entire image surface). The feature detection layer (1, 0) is constructed of neuron elements, each having a receptive field structure corresponding to a category of feature amount (which is, e.g., gradients of line segments defined as a geometrical structure in the case of extracting the line segments in a predetermined direction as a geometrical feature), and generating a pulse train corresponding to a degree thereof.

A feature detection layer (1, k) configures processing channels with the plurality of resolutions (or at the plurality of scale levels) on the whole (wherein k≧0). Namely, when exemplifying a case where the Gabor wavelet conversion is executed on the feature detection layer (1, 0), a set of feature detection cells with Gabor filter kernels having the same scale level but different directional selectivities as a receptive field structure, configure the same processing channel on the feature detection layer (1, 0), and, on a subsequent layer (1, 1) also, the feature detection cells (for detecting a higher-order feature) receiving outputs from the former feature detection cells, belong to the same channel as the above processing channel.

On a still subsequent layer (1, k) (wherein k>1) also, the feature detection cells receiving the outputs from the plurality of feature integration cells configuring the same channel similarly on a (2, k−1) layer, are structured to belong to this channel. The processing at the same scale level (or with the same resolution level) proceeds through each processing channel, wherein the low-order through high-order features are detected and recognized by hierarchical parallel processing.

A feature integration layer (2, 0) has a predetermined receptive field structure (the receptive field hereinafter implies a connecting range with an output element of an immediate anterior layer, and the receptive field structure implies a connecting load distribution), and is constructed of neuron elements each generating the pulse train. The feature integration layer (2, 0) integrates a plurality of neuron element outputs within the same receptive field from the feature detection layer (1, 0) (the integration involving an operation such as sub-sampling based on local averaging and so on). Further, each receptive field of the neuron within the feature integration layer has a structure common to the neurons within the same layer. Each of the feature detection layers (1, 1), (1, 2), . . . , (1, N) and the feature integration layers ((2, 1), (2, 2), . . . , (2, N)) has a predetermined receptive field structure acquired by learning. The former group of feature detection layers ((1, 1), . . . ) detect, as by the respective layers described above, a plurality of different features in respective feature detection modules. The latter group of feature integration layers ((2, 1), . . . ) integrate results of detecting the plurality of features from the anterior feature detection layers. The former group of feature detection layers are, however, connected (wired) to receive cell element outputs of the anterior feature integration layers belong to the same channel. The sub-sampling defined as a process executed by the feature integration layer involves averaging the outputs from local areas (local receptive fields of the concerned feature integration layer neurons) from a feature detection cell group coming under the same feature category.

Figure 2B:
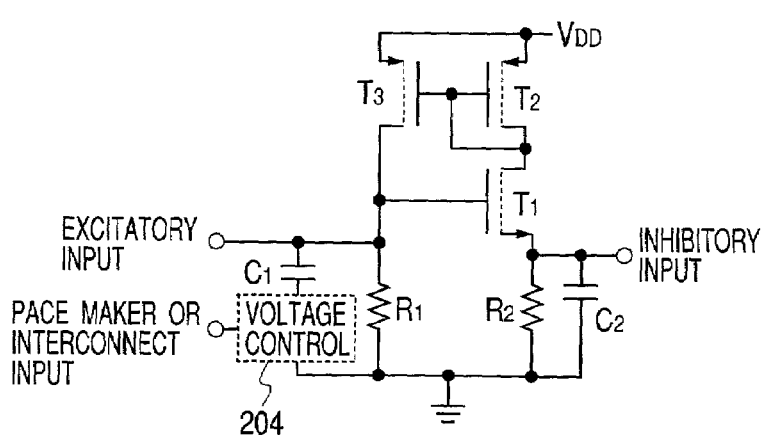
Figure 2C:
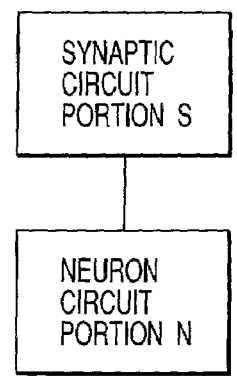

FIGS. 2A to 2C are diagrams showing a configuration of a synaptic circuit and a configuration of the neuron element. A structure for connecting inter-layer neuron elements 201 is, as depicted in FIG. 2A, built by a signal transmission portion 203 (a wire or a delay line) corresponding to an axon of a neural cell and by synaptic circuits S202 corresponding to dendrites thereof. FIG. 2A shows the connecting architecture related to the outputs (that are inputs if viewed from a certain feature detection (integration) cell (N)) from a neuron group (ni) of a feature integration (detection) cell that configures the receptive field with respect to the feature detection (integration) cell (N). The signal transmission portion 203 drawn by a bold line serves as a common bus line, and pulse signals from the plurality of neurons, which a re arranged in time-series, are transmitted through on this signal transmission line. The same architecture is also adopted in the case of receiving the inputs from the cell (N) as an output destination. In this case, the input signals and the output signals may be processed in separation on the time-base absolutely in the same architecture, or the processing may be executed in a way that gives the same architecture as FIG. 2A shows in two systems for inputting (the dendrite-side) and for outputting (the axon-side).

The synaptic circuits S202 are categorized into those related to the inter-layer connections (which are the connection between the neurons on the feature detection layer 102 and the connection between the neurons on the feature integration layer 103, and there might exist the on-layer neuron connections to a posterior layer and to an anterior layer), and those related to the connections between the neurons within on the same layer. The latter type of synaptic circuits are used, as the necessity may rise, mainly for connections with pacemaker neurons that will be explained later on and with the feature detection or integration neurons.

In the synaptic circuit S202, a so-called excitatory connection involves amplifying the pulse signals, while an inhibitory connection involves attenuating the signals. In the case of transmitting the information through on the pulse signals, the amplification and the attenuation can be actualized by any one of an amplitude modulation, a pulse width modulation, a phase modulation and a frequency modulation of the pulse signal.

According to the first embodiment, the synaptic circuit S202 is used chiefly for a pulse phase modulation element, wherein the signal amplification is converted into a substantial advance as a quantity intrinsic to a feature of a pulse arrival time, whereas the attenuation is converted into a substantial delay. Namely, the synaptic connection, as will be mentioned later on, gives an arrival position (phase) on the time-base that is intrinsic to the feature in the neurons at the output destination, wherein the excitatory connection gives a phase advance of the arrival pulse with respect to a certain reference phase in terms of a qualitative aspect, and the inhibitory connection gives a delay likewise.

Referring to FIG. 2A, each of neuron elements nj outputs the pulse signals (a spiked signal train), and involves the use of a so-called integrate-and-fire type neuron element as will be explained below. Note that the synaptic circuit and the neuron elements may, as illustrated in FIG. 2C, be combined to configure a circuit block.

Neuron Element

Next, the neurons that form each layer will be described. Each of the neuron elements is extension-modeled based on the so-called integrate-and-fire type neuron, and is the same as this integrate-and-fire type neuron in terms of such a point that the neuron element fires when a result of linearly adding the input signals (a pulse train corresponding to an action potential) spatiotemporally exceeds a threshold value, and outputs the pulse signals.

FIG. 2B shows one example of a basic architecture representing a behavior principle of the pulse generation circuit (CMOS circuit) defined as the neuron element, and illustrates what a known circuit (IEEE Trans. On Neural Networks Vol. 10, p. 540) is extended. Herein, the pulse generation circuit is constructed as what receives the excitatory input and the inhibitory input.

The behavior principle of this pulse generation circuit will hereinafter be explained. A time constant of a capacitor $C_1$/resistor $R_1$ circuit on the side of the excitatory input, is smaller than a time constant of a capacitor $C_2$/resistor $R_2$ circuit on the side of the inhibitory input. In a steady state, transistors $T_1$, $T_2$, $T_3$ are cut off. Note that the resistor is actually constructed of a transistor connected in a diode mode.

When an electric potential of the capacitor $C_1$ increases and gets higher by a threshold value of the transistor $T_1$ than that of the capacitor $C_2$, the transistor $T_1$ becomes active, and further the transistors $T_2$, $T_3$ get active. The transistors $T_2$, $T_3$ form a current mirror circuit, and an output of the circuit shown in FIG. 2B is given forth from the side of the capacitor $C_1$ by an unillustrated output circuit. The circuit is structured so that when an electric charge accumulation amount of the capacitor $C_2$ is maximized, the transistors $T_1$ falls into a shutdown, then the transistors $T_2$, $T_3$ are cut off as a result of the above shutdown, and a positive feedback comes to 0.

During a so-called refractory period, the capacitor $C_2$ discharges, and, if a potential of the capacitor $C_1$ is larger than a potential of the capacitor $C_2$ and unless a difference therebetween is over the threshold value of the transistor $T_1$, the neuron does not respond. The periodic pulses are outputted with a repetition of alternate charging/discharging of the capacitors $C_1$, $C_2$, and a frequency thereof is generally determined corresponding to a level of the excitatory input. Owing to an existence of the refractory period, the frequency can be, however, restricted to the maximum value, and a fixed frequency can also be outputted.

The potential, i.e., the charge accumulation amount of the capacitor is controlled in terms of the time by a reference voltage control circuit (time window weighting function generation circuit) 204. What reflects this control characteristic is a weighted addition within a time window with respect to the input pulse, which will be mentioned later on (see FIGS. 7A to 7E). This reference voltage control circuit 204 generates a reference voltage signal (corresponding to a weighting function in FIG. 7B) on the basis of an input timing (or an interconnection input to the neuron of the subsequent layer) from a pacemaker neuron that will hereinafter be described.

Generally, a relationship between the summation of the input signals and the output level (the pulse phase, the pulse frequency, the pulse width and so forth) changes depending on a sensitivity characteristic of the neuron. This sensitivity characteristic can be changed depending on a top-down input from a higher-order layer. In the following discussion, it is assumed for an explanatory convenience that circuit parameters be set so that a pulse output frequency corresponding to the summation value of the input signals rises steeply (therefore, the values are substantially binary in a frequency domain) and that the output level (such as a timing with a phase modulation added) and so on) fluctuates depending on the pulse phase modulation.

Figure 5A:
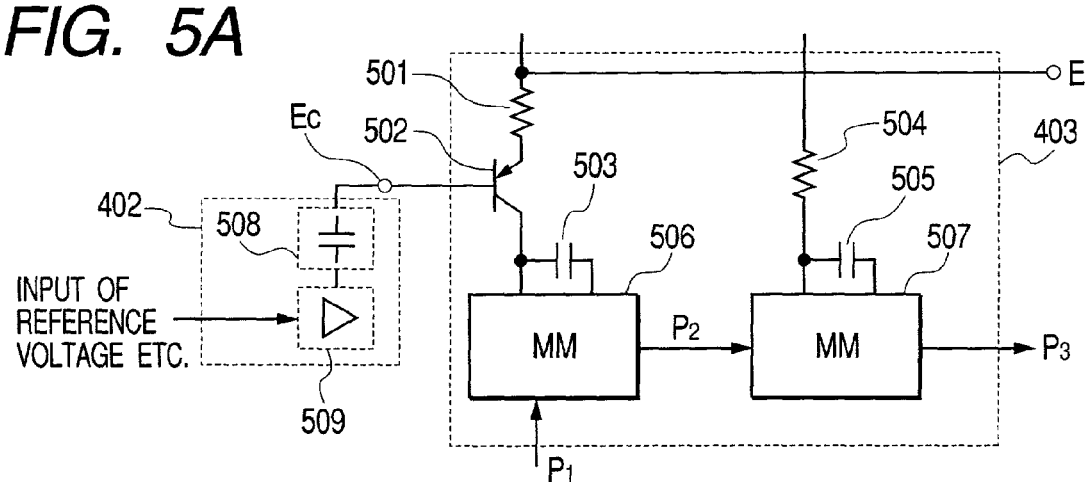
FIGS. 5A, 5B and 5C are diagrams showing an architecture of a synaptic connection small circuit, and an architecture of a pulse phase delay circuit used in an embodiment 1.
Figure 5B:
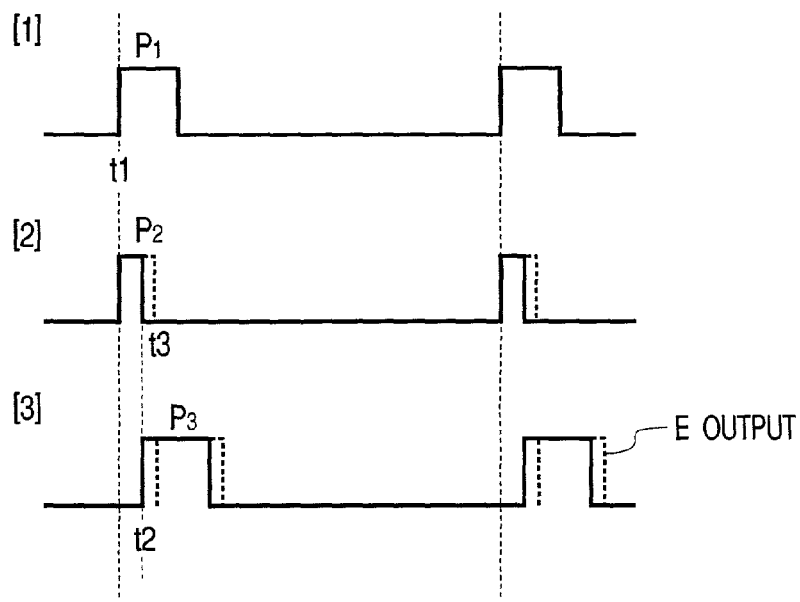
Figure 5C:
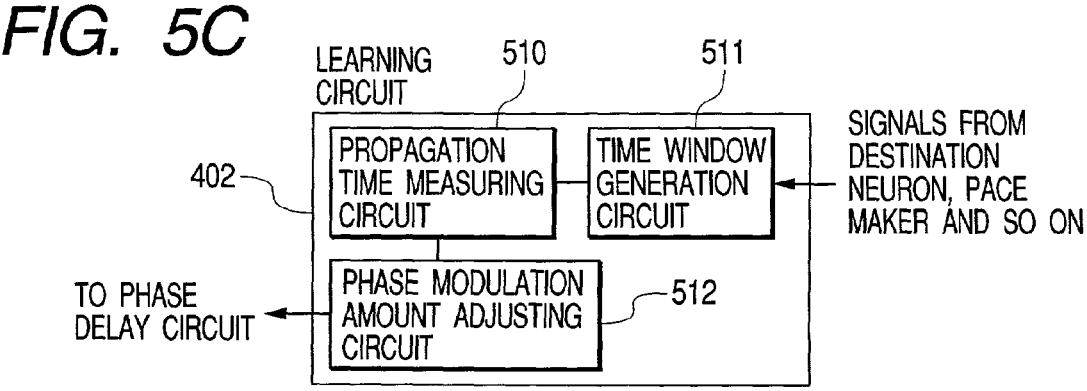

Moreover, a pulse phase modulation portion may have an addition of the circuits as shown in FIGS. 5A to 5C, which will hereinafter be described. With this scheme, the weighting function in the time window is controlled based on the reference voltage with the result that the phase-of the pulse output from this neuron changes, and this phase can be used as an output level of the neuron.

Figure 7A:
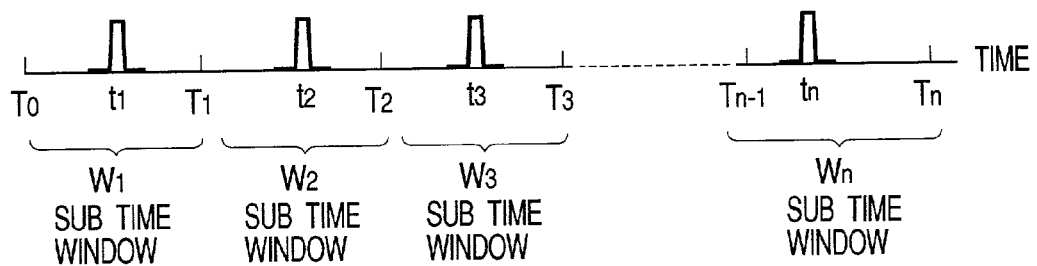
FIGS. 7A, 7B, 7C, 7D and 7E are graphs showing a structure of a time window, an example of a weighting function distribution and an example of feature elements in the case of processing a plurality of pulses corresponding to the different feature elements, which are inputted to feature detection neurons.
Figure 7B:
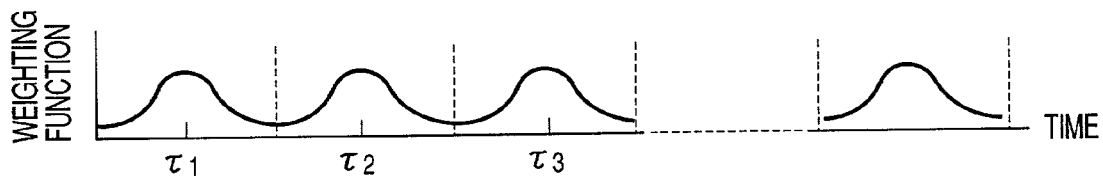

A time $\tau_{w1}$, as shown in FIG. 7B, corresponding to a maximum value of the weighting function that gives a time integrating characteristic (receiving sensitivity characteristic) with respect to the pulse having undergone the pulse phase modulation at the synaptic connection, is generally set earlier in time than an arrival predicted time $\tau_{s1}$ of the pulse intrinsic to the feature given by the synaptic connection. As a result, the pulse arriving earlier than the arrival predicted time within a fixed range (the pulse arriving too early is attenuated in the example in FIG. 7B) is, in the neuron receiving this pulse, integrated in time as a pulse signal having a high output level. A profile of the weighting function is not limited to a symmetry as seen on Gaussian function etc and may assume an asymmetry. It should be noted based on the gist elucidated above that the center of each weighting function in FIG. 7B does not correspond to the pulse arrival predicted time.

Further, an output phase of a (presynaptic) neuron has such an output characteristic that a delay (phase from a fiducial time corresponding to the beginning of the time window as will be explained later on, is determined by the charge accumulation amount after detecting phase synchronization when receiving the reference pulse (based on the pacemaker output and others). A detailed architecture of the circuit giving this output characteristic is not essential to the present invention and is therefore omitted herein. A pulse phase of a postsynaptic neuron is what the pulse phase of the presynaptic neuron is added to an intrinsic phase modulation amount given at the synapse concerned.

Further, there may also be utilized such a known circuit architecture as to give forth an oscillatory output delayed by a predetermined timing when the input summation value obtained by use of the window function and so on exceeds the threshold value.

The architecture of the neuron elements using the neurons belonging to the feature detection layer 102 or the feature integration layer 103, may take such a circuit architecture as to output the pulse with a phase delay corresponding to the input level (the simple or weighted summation value of the inputs described above) at which the concerned neuron receives from the receptive field of the anterior layer after attaining the phase synchronization of the output receiving the pulse outputted from the pacemaker neuron in a case where a firing pattern is controlled based on an output timing phase synchronization circuit of the pacemaker neuron that will be mentioned later on. In this case, before the output to which the pulse signal from the pacemaker neuron is inputted is phase-synchronized, there exists a transient state where the respective neurons output the pulses in random phases with respect to each other in accordance with the input levels.

The neuron of the feature detection layer has, as explained above, the receptive field structure corresponding to the feature category, and outputs the pulse with an output (given herein in the form of the phase change; it may also be structured to show a change based on the frequency, the amplitude and the pulse width) taking a so-called squashing function value, i.e., such a non-reductive and nonlinear function as to gradually saturate with a fixed level, as in the case of, e.g., a sigmoidal function etc. in accordance with a load summation value (that will be explained below) when this load summation value depending on the time window function of the input pulse signal from the neuron of the anterior layer (the input layer or the feature integration layer) is equal to or larger than the threshold value.

Synaptic Circuit and Others

Figure 4A:
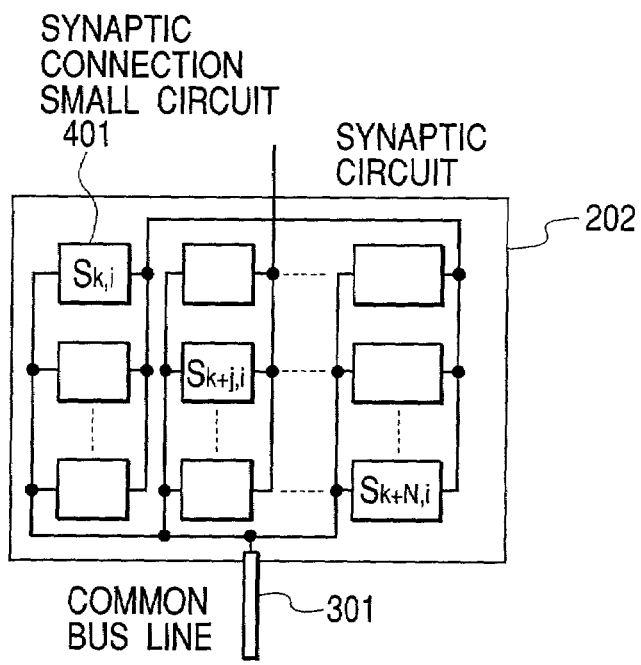
FIGS. 4A, 4B and 4C are diagrams showing an architecture of a synaptic circuit.
Figure 4B:
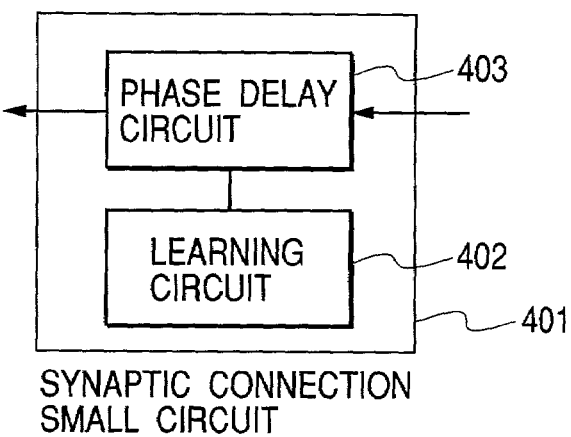
Figure 4C:
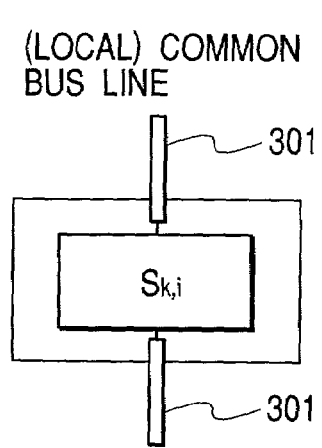

FIGS. 4A to 4C show a matrix layout of synaptic connection small circuits each giving a synaptic connection strength (that implies a magnitude of the modulation in regard to the phase delay etc) to each of neurons $n'_j$ to which the neurons ni are connected in the synaptic circuit 202 (Si).

Figure 3A:
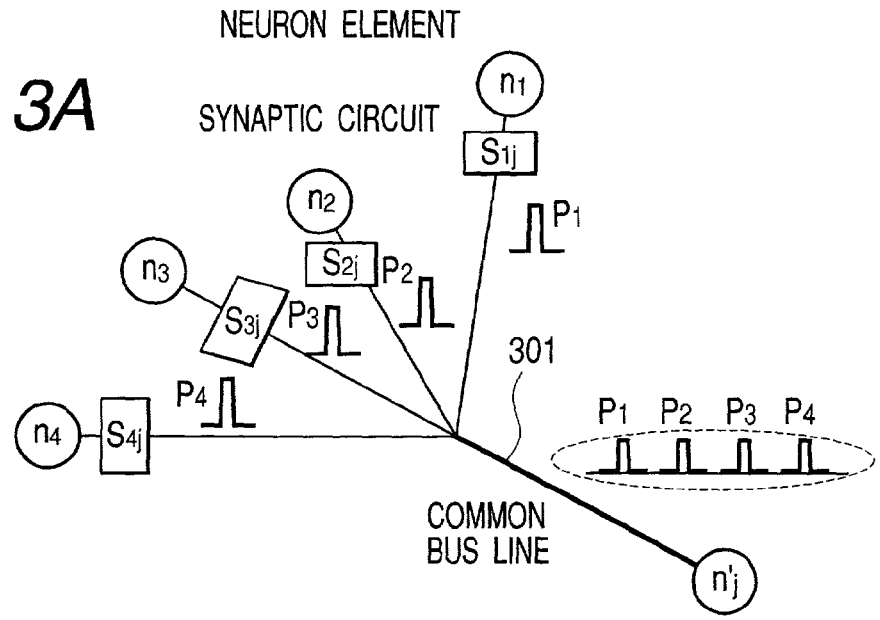
FIGS. 3A and 3B are diagrams showing how a plurality of pulses are propagated to feature detection layer neurons from a feature integration layer (or an input layer)

If the network takes such an architecture as to have a shared connection mode (for representing the synaptic connection with one single weighting coefficient in the same way) of the connection loads, delay quantities (indicated by $P_{ij}$ below) at the respective synapses can be uniformed within the same receptive field unlike the case shown in FIGS. 3A and 3B. Particularly, the connection to the feature integration layer from the feature detection payer may take this architecture without depending on the detection object (i.e., without depending on a category of the target) in a case where the feature integration layer performs the sub-sampling based on the local averaging (the uniform weighting is, however, to be adopted)of the outputs from the feature detection layer existing anterior to this feature integration layer.

In this case, as illustrated in FIG. 4C, a single circuit $S_{k,i}$ suffices for forming each of the synaptic connection small circuits 401 in FIG. 4A, and this circuit architecture is particularly economical. On the other hand, if the connection to the feature detection layer from the feature integration layer (or a sensor input layer) takes this circuit architecture, what the feature detection neuron detects is such an event that the pulses representing a plurality of different feature elements arrive simultaneously (or arrive substantially at the same time).

As depicted in FIG. 4B, each of the synaptic connection small circuits 401 is constructed of a learning circuit 402 and a phase delay circuit 403. The learning circuit 402 adjusts the above delay quantity by changing a characteristic of the phase delay circuit 403. Further, the learning circuit 402 stores a characteristic value thereof (or a control value thereof) on a floating gate element or on a capacitor connected to the floating gate element. The phase delay circuit 403 is classified as a pulse phase modulation circuit and is, as shown in FIG. 5A, configured by using, for instance, monostable multivibrators 506, 507, resistors 501, 504, capacitors 503, 505 and a transistor 502. FIG. 5B shows respective timings of a rectangular wave P1 ((1) in FIG. 5B) inputted to the monostable multivibrator 506, a rectangular wave P2 ((2) in FIG. 5B) outputted from the monostable multivibrator 506, and a rectangular wave P3 ((3) in FIG. 5B) outputted from the monostable multivibrator 507.

Though a detailed explanation of an operational mechanism of the phase delay circuit 403 is omitted, a pulse width of the rectangular wave P1 is determined by a time till a voltage of the capacitor 503 based on a charging current reaches a predetermined threshold value, while a pulse width of the rectangular wave P2 is determined by a time constant of the resistor 504 and the capacitor 505. If the pulse width of P2 expands (as indicated by a dotted-line rectangular wave in FIG. 5B) and if a fall timing thereof is shifted back, a rise timing of P3 is shifted by the same quantity, however, the pulse width of P3 remains unchanged, and it therefore follows that the rectangular wave is outputted in a way of being modulated by a phase of the input pulse.

A control voltage Ec is changed by the learning circuit 402 for controlling the charge accumulation amount to a refresh circuit 509 having the reference voltage and to the capacitor 508 for giving the connection load, whereby the pulse phase (delay quantity) can be controlled. A long-term retainment of this connection load may involve storing the connection load as charge of the floating gate element (not shown) provided outside the circuit shown in FIG. 5A after the learning behavior or by writing it to a digital memory and so on. There may be utilized other known circuit architectures such as the architectures (refer to e.g., Japanese Patent Application Laid-Open Nos. 5-37317 and 10-327054) each schemed to downsize the circuit.

What is exemplified as the learning circuit at the synapse that actualizes the simultaneous arrival of the pulses or the predetermined phase modulation amount, includes the circuit elements as shown in FIG. 5C. To be specific, the learning circuit 402 can be constructed of a pulse propagation time measuring circuit 510 (a propagation time herein indicates a time difference between a time of the pulse output of a presynaptic neuron on a certain layer and an arrival time of this pulse at an output destination neuron existing on a next layer), a time window generation circuit 511, and a pulse phase modulation amount adjusting circuit 512 for adjusting a pulse phase modulation amount in the synaptic portion so that the propagation time takes a fixed value.

The propagation time measuring circuit 510 involves the use of an architecture for inputting clock pulses from the pacemaker neurons configuring the same local receptive field as will be explained later on and obtaining the propagation time based on an output from a counter circuit for these clock pulses in duration of a predetermined time width (time window: see FIG. 3B). Note that the time window is set based on a point of firing time of the output destination neuron, whereby Hebb's learning algorithm (rule) extended as shown below is applied.

Process (Extraction of Low-Order Feature) on Feature Detection Layer (1,0)

Supposing that the feature detection layer (1,0) contains the neurons detecting a structure (low-order feature) of a pattern having a predetermined spatial frequency in a local area having a certain size and a directional component of being vertical and if there exists a structure corresponding to an interior of the receptive field of N1 on the data input layer 1, the neuron outputs the pulse in phase corresponding to a contrast thereof. This type of function can be actualized by a Gabor filter. A feature detection filter function performed by each of the neurons of the feature detection layer (1,0) will hereinafter be discussed.

It is assumed that the Gabor wavelet conversion expressed by a filter set having multi-scales and multi-directional components on the feature detection layer (1,0) and each of the intra-layer neurons (or each group consisting of a plurality of neurons) has a predetermined Gabor filtering function. On the feature detection layer, one single channel is configured by clustering a plurality of neurons groups each consisting of neurons having the receptive field structures corresponding to a convolutional operation kernels of a plurality of Gabor functions that have a fixed scale level (resolution) and different directional selectivities. The neuron group forming the same channel has a different directional selectivity, and the neuron groups exhibiting the same size selectivity may be disposed in positions adjacent to each other, or the neuron groups belonging to different processing channels may also be disposed adjacent to each other. This scheme is based on an idea that the actualization is easier in terms of the circuit architecture by adopting the layouts shown in the respective Figures for the convenience's sake of a connecting process that will be mentioned below in the group-oriented coding.

Incidentally, for details of the method of executing the Gabor wavelet conversion in the neural network, refer to a document (IEEE Trans. On Acoustics, Speed, and Signal Processing, vol. 36, pp. 1169–1179) by Daugman (1988).

Each of the neurons of the feature detection layer (1,0) has the receptive field structure corresponding to a kernel $g_{mn}$. The kernel $g_{mn}$ having the same scale index m has a receptive field of the same size, and a corresponding kernel gmn size is set corresponding to the scale index in terms of the operation. Herein, the sizes such as 30×30, 15×15 and 7×7 are set on the input image in sequence from the roughest scale. Each neuron outputs the pulse at such an output level (which is herein on a phase basis; an architecture on a frequency basis or an amplitude basis or a pulse basis may also, however, be used) as to become a nonlinear squashing function of a wavelet conversion coefficient value obtained by inputting a sum of products of distribution weighting coefficients and image data. As a result, it follows that the Gabor wavelet conversion is executed as an output of this whole layer (1,0).

Processes (Extractions of Intermediate- and High-Order Features) on Feature Detection Layer Unlike the feature detection layer (1,0), each of the neurons of the subsequent feature detection layers ((1,1), (1,2), . . . ) forms, based on the so-called Hebb's learning algorithm etc, the receptive field structure for detecting a feature intrinsic to a pattern of a recognition object. On a more posterior layer, a size of the local area in which to detect the feature becomes stepwise more approximate to a size of the whole recognition object, and geometrically an intermediate- or high-order feature is detected.

For instance, when detecting and recognizing a face, the intermediate- (or high-order) feature represents a feature at pattern-element-oriented levels such as eyes, a nose, a mouth etc shaping the face. Between different channels, if at the same hierarchical level (the same level in terms of a complexity of the feature to be detected), a difference of the feature detected comes under the same category but is what is detected by the scales different from each other. For example, the [eye] defined as the intermediate-order feature is detected as an [eye] having a different size at a different processing channel. Namely, the scheme is that the in-image [eye] having a given size is detected at the plurality of processing channels exhibiting different scale level selectivities.

Note that each of the neurons of the feature detection layer may generally have such a mechanism as to receive, based on the output of the anterior layer, an inhibitory (shunting inhibition) connection in order to stabilize the output (without depending on the extractions of the low- and high-order features).

Process on Feature Integration Layer

The neurons of the feature integration layers ((2,0), (2,1), . . . ) will be explained. As illustrated in FIG. 1, the connection to the feature integration layer (e.g., (2,0)) from the feature detection layer (e.g., (1,0)) is configured to receive, on the excitatory input side, both of outputs of phase synchronization circuits that will be described below and inputs of the excitatory connections from the neurons of the same category (type of feature elements of the anterior feature detection layer within the receptive fields of the concerned feature integration neurons. The function of the neuron of the integration layer is, as explained above, the local averaging or sub-sampling for every feature category.

According to the former mode, the plurality of pulses of the same category of feature are inputted, and then integrated and averaged in the local area (receptive field) (alternatively, a representative value such as a maximum value is calculated within the receptive field), thereby making it possible to surely detect a positional fluctuation and a deformation of the feature. Therefore, the receptive field structure of the neuron of the feature integration layer may be formed so as to become uniform (such as being in a rectangular area having a predetermined size in any cases and exhibiting a uniform distribution of the sensitivity or the weighting coefficient therein) without depending on the feature category.

Pulse Signal Processing on Feature Integration Layer

As discussed above, according to the first embodiment, the feature integration cell is not structured to receive the synchronization detection signal from the phase synchronization circuit on the feature detection layer with a layer number (1,k) anterior thereto. The reason is that in the feature integration cell, the neurons output the pulses in phase (any one of the frequency, the pulse width and the amplitude may be dependent, however, the phase is adopted in the first embodiment) determined not by the arrival time pattern of the input pulse but by, if anything, an input level (such as a temporal summation value of the input pulses) within a fixed time range, and hence a time window occurrence timing is not so important. Note that this does not intend to exclude an architecture in which the feature integration cell receives the synchronization signal from the phase synchronization circuit of the anterior feature detection layer, and this architecture is, as a matter of course, feasible.

Behavior Principles of Pattern Detection and Phase Synchronization

Next, pulse encoding of a two-dimensional graphic pattern and a detection method thereof will be explained. FIGS. 3A and 3B schematically shows how the pulse signals are propagated to the feature detection layer from the feature integration layer (e.g., from the layer (2,0) to the layer (1,1) in FIG. 1). The neurons ni on the side of the feature integration layer correspond to feature amounts (or feature elements) different from each other, while the neurons $n'_j$ on the side of the feature detection layer get involved in detecting a higher-order feature (pattern elements) obtained by combining the respective features within the same receptive field.

An intrinsic delay (intrinsic to the feature) due to a pulse propagation time and a time delay etc in the synaptic connection ($S_{j,i}$) to the neuron $n'_j$ from the neuron ni, occurs in each inter-neuron connection. As a result, so far as the pulses are outputted from the neurons of the feature integration layer, pulses of a pulse train Pi are set to arrive at the neuron $n'_j$ in a predetermined sequence (such as P4, P3, P2, P1 in FIG. 3A), depending on a delay quantity at the synaptic connection that is determined by learning.

Figure 3B:
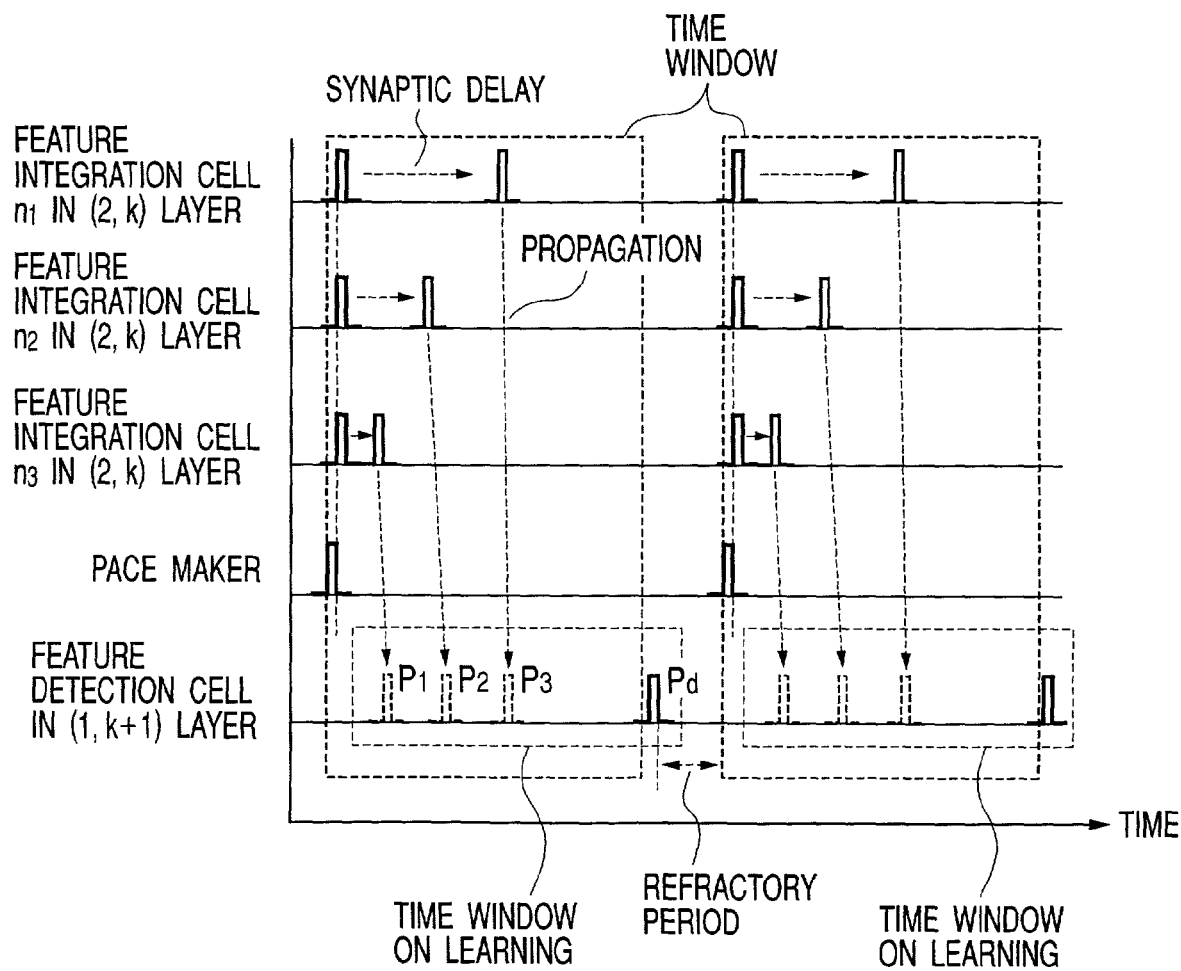

FIG. 3B shows a pulse propagation timing to a certain feature detection cells ($n'_j$) (detecting a higher-order feature) in a layer having a layer number (1,k+1) from feature integration cells n1, n2, n3 (individually representing different categories of features) in a layer having a layer number (2,k) after taking the phase synchronization between the neurons of the feature integration layer in the case of executing the synchronization control of the time window by using the synchronization detection signal transmitted from the phase synchronization circuit that will be explained later on.

Figure 13:
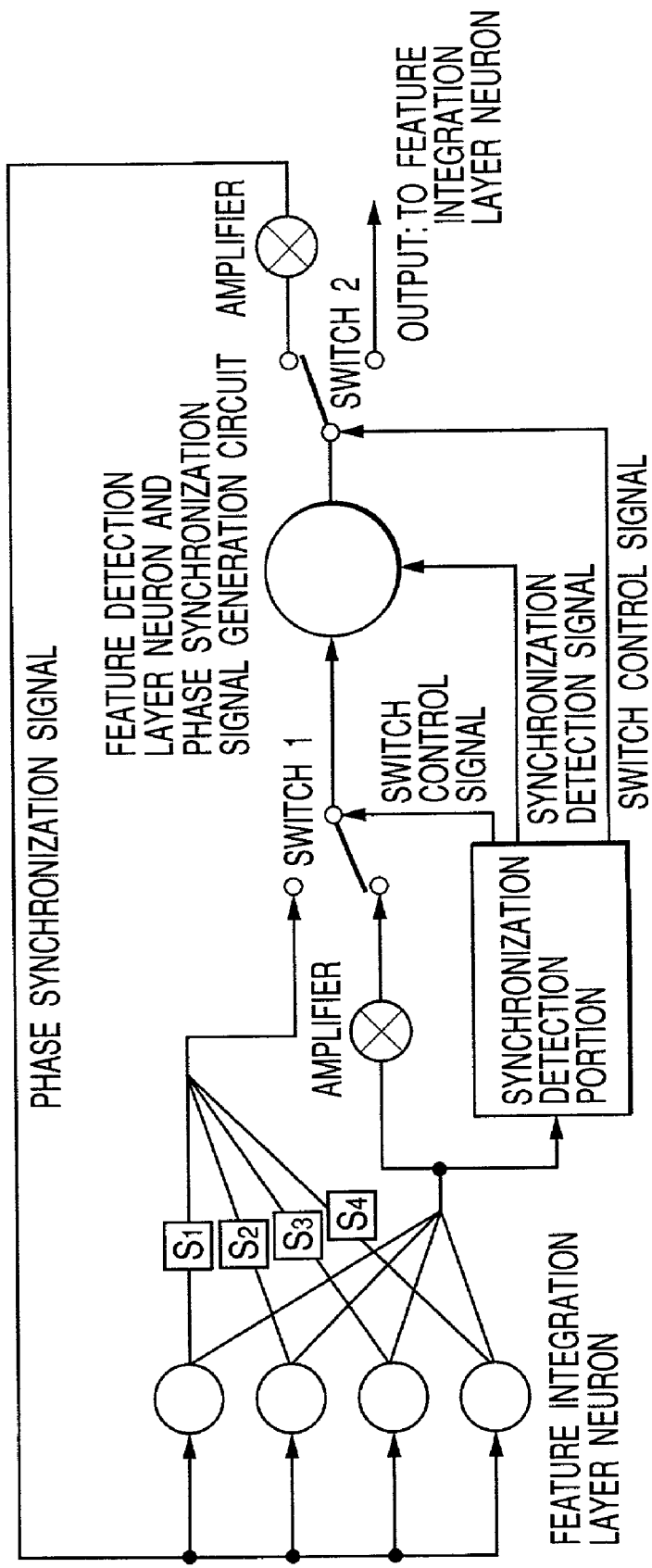
FIG. 13 is a schematic diagram showing an example of a topology in a phase synchronization process in the first embodiment.

Referring to FIG. 13, the phase synchronization circuit is connected to the feature detection neuron forming the same receptive field and detecting a different category of feature, forms the same receptive field as that of the feature detection neuron and receives the excitatory connection from the feature integration layer (or the input layer). Further, an output from the phase synchronization circuit is outputted to the excitatory input of the neuron of the feature integration layer, and hence there exists an (loop-shaped) interconnection between the feature integration layer group and the phase synchronization circuit.

Subsequently, the circuit architecture in the first embodiment, as depicted in FIG. 13, includes a synchronization detection portion for detecting the phase synchronization of the output signals upon receiving an input of this output signal from the feature integration layer neuron, controlling switches 1, 2 and outputting the synchronization detection signal, and a module having an interconnection with the feature integration layer neuron and performing two types of functions as the feature detection layer neuron and as a phase synchronization signal generation circuit.

Note that these two types of functions are switched over by operating the switches 1, 2.

Subsequently, a processing flow in the architecture described above will be described in sequence.

At first, each of the feature detection layer neuron and the phase synchronization signal generation circuit functions as the phase synchronization signal generation circuit till the phase synchronization of the output from the feature integration layer neuron is established (hereinafter this is called the phase synchronization signal generation circuit till the phase synchronization is established).

Note that the switch 1 is connected downward, while the switch 2 is connected upward at the present time.

When the feature integration layer neuron fires upon receiving the output from the anterior layer and gives forth an output, the output signal thereof is amplified by the amplifier and thereafter inputted to the phase synchronization signal generation circuit. The phase synchronization signal generation circuit, when receiving even a single input, outputs the phase synchronization signal defined as the pulse signal to the feature integration neuron.

Assuming herein that a threshold value characteristic of the phase synchronization signal generation circuit be set to have a predetermined value, the output from the feature integration layer neuron is temporarily transmitted through the amplifier and amplified therein so that the phase synchronization signal generation circuit can fire with one single pulse.

Subsequently, the phase synchronization signal outputted by firing of the phase synchronization signal generation circuit is inputted to the feature integration layer neuron, however, a level of the phase synchronization signal received finally by the feature integration layer neuron is herein set so that the output pulse of the phase synchronization signal generation circuit is inputted to the amplifier to amplify the signal level, and an internal potential of the feature integration layer neuron can reach a threshold value within an allowable phase difference.

Herein, the allowable phase difference corresponds to a phase synchronization detection window width in FIG. 16, and, as will be mentioned below, the phase synchronization detection portion detects the phase synchronization with the aid of an integrated value of the output signal from the feature integration layer, which has been inputted inside the phase synchronization detection window.

The feature integration layer neuron, upon receiving a phase synchronization pulse signal, except for a certain instance just during a refractory period, exceeds a firing threshold level due to the phase synchronization pulse signal in whatever internal condition.

Figure 15A:
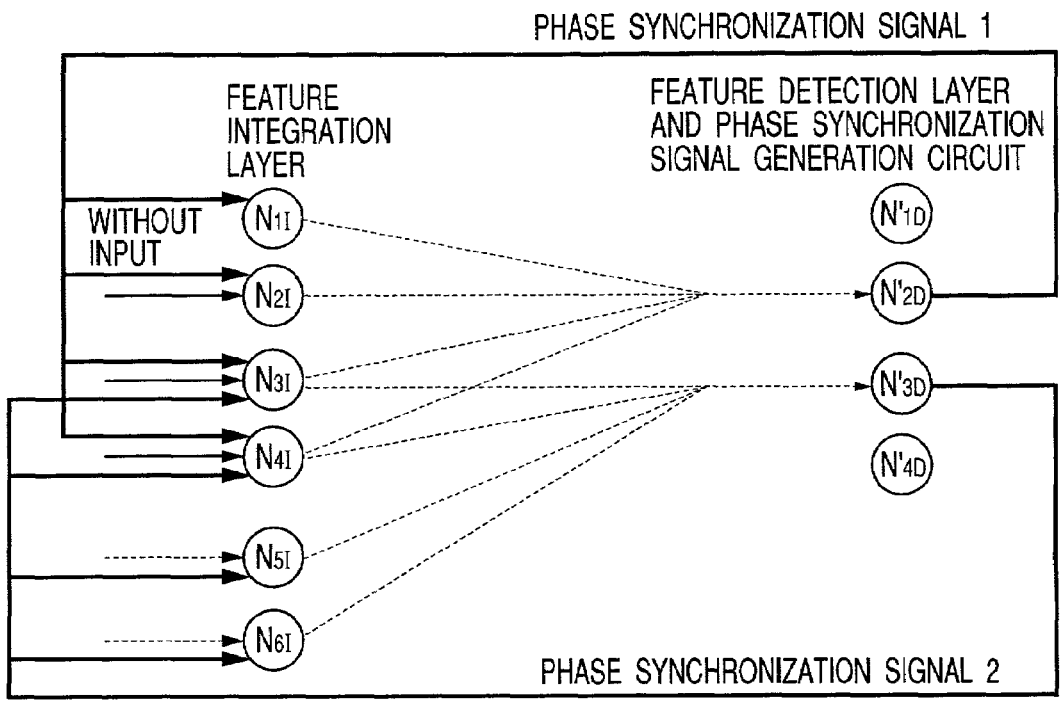
FIGS. 15A and 15B are diagrams showing a topology wherein inputs and outputs of phase synchronization signals are based, and a firing process with the phase synchronization signal.
Figure 15B:
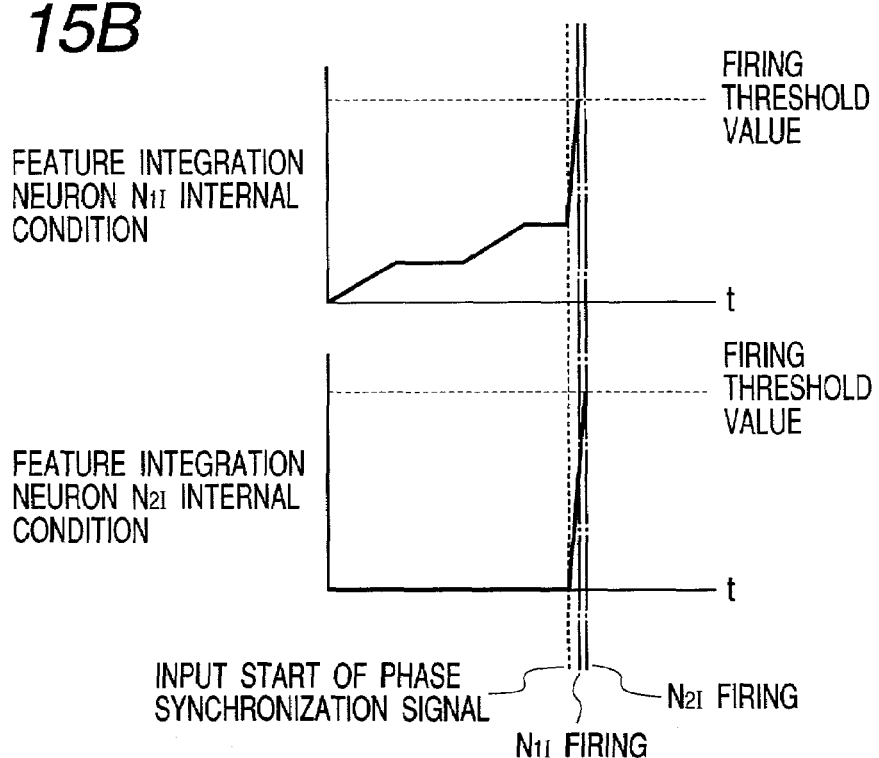

Herein, as shown in FIG. 15B, a minute difference between firing phases of the feature integration layer neurons, occurs depending on a difference between the internal conditions of the respective feature integration layer neurons just when the phase synchronization pulse signal is inputted. As explained above, however, since the phase synchronization signal level is set so that the phase difference is under the allowable phase difference, the outputs of the respective feature integration layer neurons to which the phase synchronization signals are inputted for a time excluding the refractory period, with the phase difference falling within the allowable phase difference, come to a synchronizing state.

Then, further the feature integration neuron staying in the refractory period in the behavior described above repeats the behavior described above till the same neuron receives the phase synchronization signal at a timing other than the refractory period and fires, whereby the synchronization of the outputs of all the feature integration layer neurons can be eventually taken.

The subsequent discussion will be focused on the phase synchronization detection portion for detecting the phase synchronization state explained above.

As shown in FIG. 13, the phase synchronization detection portion receives, as an input signal, the output of the feature integration layer neuron.

Figure 14A:
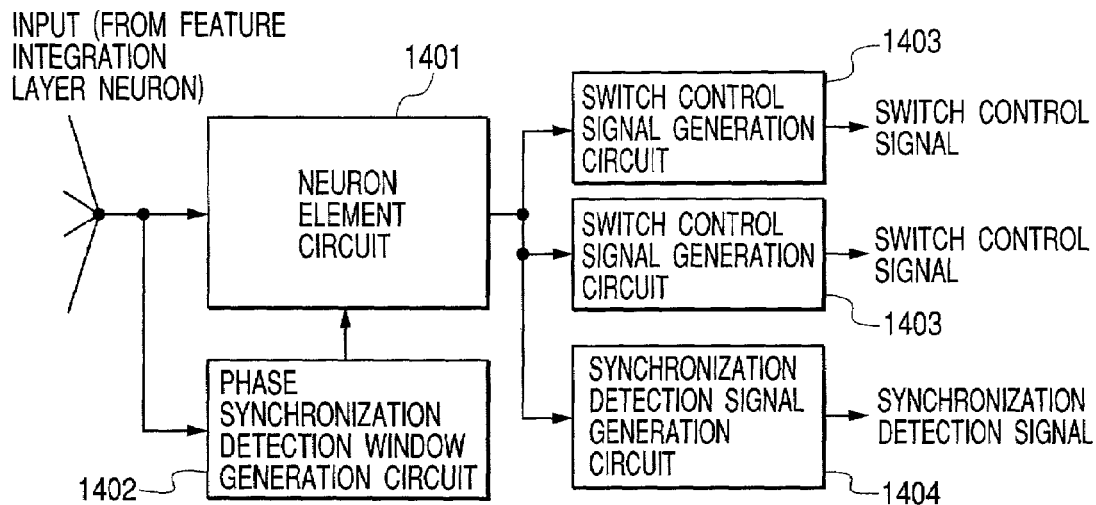
FIGS. 14A, 14B and 14C are diagrams showing configurations of blocks of the phase synchronization circuit.
Figure 14B:
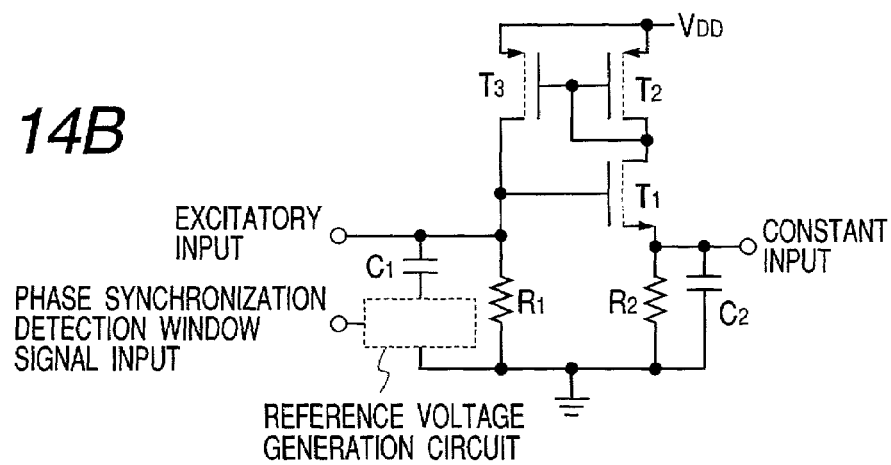

Herein, as shown in FIGS. 14A and 14B, the phase synchronization detection portion has the same architecture as that of the feature integration layer neuron that has been touched in the discussion on the neuron elements, and fires and outputs if an integrated value of input values within the phase synchronization detection windows each having a predetermined time determined by the phase synchronization detection window generation circuit, exceeds a threshold value.

Accordingly, the time width of this phase synchronization detection window is set to the allowable phase difference in the case where the feature integration layer neuron phase-synchronizes, and further a firing threshold value is set to an integrated value of the outputs of all the feature integration layer neurons to be connected, whereby the phase synchronization of the feature integration layer neuron can be detected.

Figure 16:
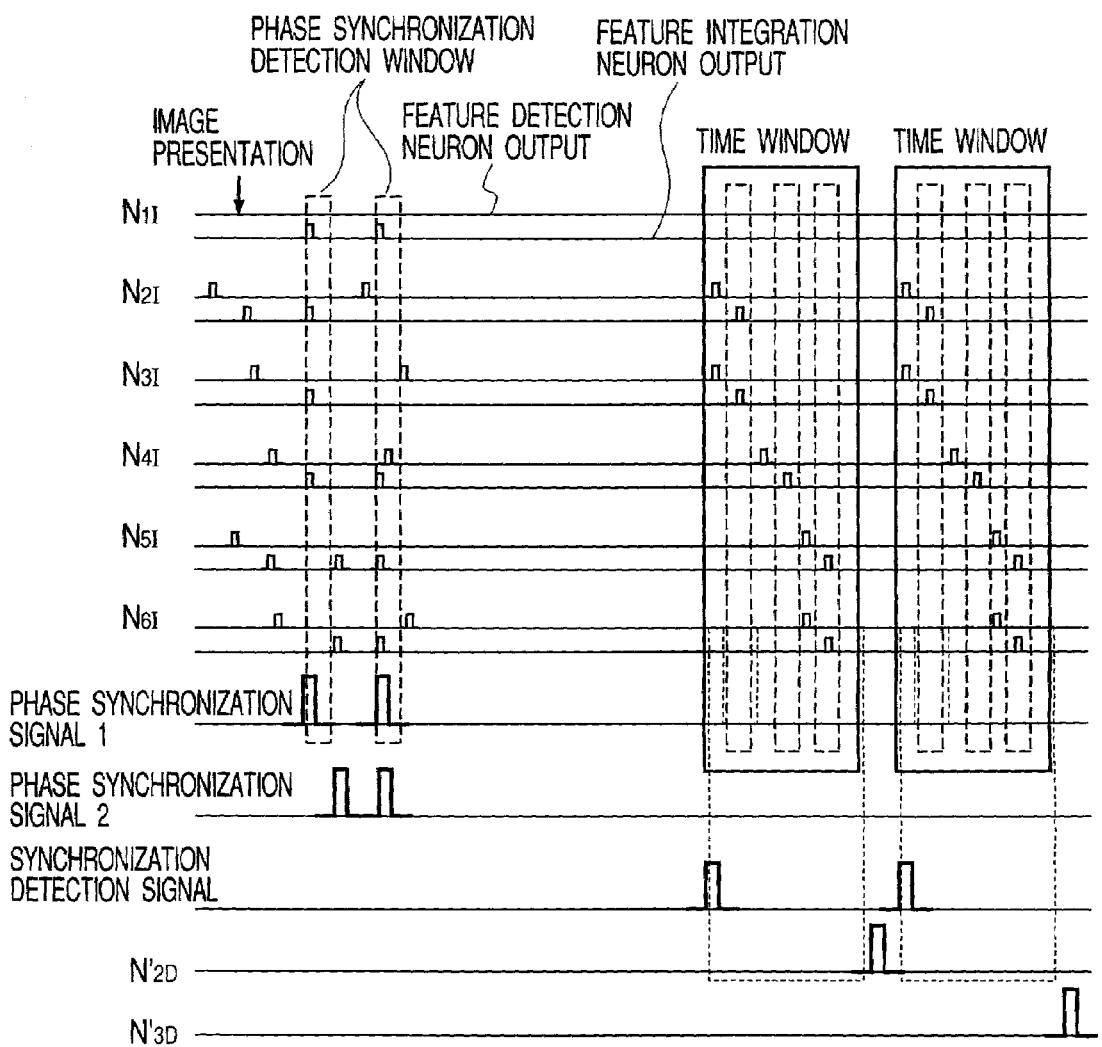
FIG. 16 is a graph showing pulse firing timings of the respective neurons.

Namely, as depicted in FIG. 16, the allowable phase difference is set as the phase synchronization detection window, and, when the outputs of all the feature integration layer neurons are synchronized, the neuron element circuit in the phase synchronization detection portion fires as the input integrated value in the phase synchronization detection window reaches the threshold value. As a consequence, the synchronous firing of the feature integration layer neuron can be therefore detected.

Next, a behavior after detecting the phase synchronization will be discussed.

As shown in FIG. 14A, the phase synchronization detection portion includes a switch control signal generation circuit that generates a switch control signal in accordance with the output of the neuron element circuit, and a synchronization detection signal generation circuit generating a synchronization detection signal in accordance with the above output.

The phase synchronization detection portion, when detecting the phase synchronization of the feature integration layer neuron due to firing of the neuron element circuit as described above, outputs the switch control signal from the switch control signal generation circuit receiving the output of the neuron element circuit, thereby switching over the switch 1 upward.

This behavior implies that the input to the phase synchronization signal generation circuit becomes what the output of the feature integration layer neuron has undergone the processes of the synaptic circuits S1 through S4, and the function of the phase synchronization signal generation circuit is switched over to the function of the feature detection layer neuron (hereinafter, the phase synchronization signal generation circuit is called the feature detection layer neuron till the feature detection layer neuron completes the operation and output based on the output signals of the feature integration layer neuron which will be mentioned later on).

Then, further the phase synchronization detection portion, in order to transmit the output from the feature detection layer neuron to a posterior processing hierarchy, outputs the switch control signal from the switch control signal generation circuit receiving the output of the neuron element circuit and switches over the switch 2 downward, thus setting in a conductive state the connection between the feature detection layer neuron and the posterior feature integration layer neuron.

Herein, the output signal of the feature integration layer neuron that is to be inputted to the feature detection layer neuron becomes, as the input of the phase synchronization signal to the feature integration layer neuron is stopped by the above switching behavior described above, an output signal based on firing that genuinely corresponds to the input from the layer anterior to the feature integration layer neuron.

Moreover, the phase synchronization detection portion outputs the synchronization detection signal to the feature detection layer neuron from the synchronization detection signal generation circuit receiving the output of the neuron element circuit, and gives a reference time for a generation timing of the time window that will be explained below.

In this case, a time required till the output from the feature integration layer arrives at the feature detection layer, is calculated beforehand, thereby making it possible to properly establish a relationship between the synchronization detection signal and the generation timing of the time window.

According to the first embodiment, the synchronization detection signal is set as the pulse-shaped signal, and the point of time when this pulse signal is inputted to the feature detection layer neuron, is set as the beginning of the time window.

Note that the integration layer neuron corresponding to the duplex receptive field portion, in the process of executing the phase synchronization process explained above, receives the inputs of a plurality of different phase synchronization signals as illustrated in FIG. 15A (herein, the input to the feature integration layer neuron from the anterior layer is indicated by a fine line, the input to the feature detection layer neuron from the feature integration layer neuron is drawn by a dotted line, and the phase synchronization signal is shown by a bold line), however, if the integration layer neuron corresponding to the duplex receptive field portion fires even once due to any one of the input from the anterior layer and the input from the phase synchronization signal generation circuit, the output pulse thereof is inputted to the plurality of phase synchronization signal generation circuits, and hence the phases of the plurality of phase synchronization signals are also synchronized at that point of time.

Accordingly, it follows that the plurality of phase synchronization signals are inputted, in a state of their phases being synchronized, to the feature integration layer neurons corresponding to the subsequent duplex receptive field portions, and the process of establishing the phase synchronization of the feature integration layer neuron takes the same course as in the case based on the single phase synchronization signal described above.

Thus, even when the feature integration layer neuron corresponding to the duplex receptive field portion receives the inputs of the plurality of phase synchronization signals, the phase synchronization of the outputs can be established with a stability without any contradiction.

Further, particularly in the phase synchronization signal generation circuit, if a time interval till the phase synchronization signal is outputted since the signal has been inputted, is set equal to or longer than the refractory period of the feature integration layer neuron, the feature integration layer neuron that did not fire because of the phase synchronization signal being inputted during the refractory period, becomes capable of firing and outputting in a way that phase-synchronizes with other feature integration layer neurons when inputting the next phase synchronization signal, whereby the time up to the phase synchronization can be reduced.

An arithmetic behavior of the feature detection layer neuron after the phase synchronization of the output of the feature integration layer neuron has been detected, will be explained in succession.

When the synchronization detection signal is inputted to the feature detection layer neuron from the phase synchronization detection portion, as described above, the time window occurs due to the synchronization detection signal.

Herein, the time window, which is determined for every feature detection layer neuron (n'$_i$), is common to the respective neurons within the feature integration layer forming the same receptive field with respect to the neuron (n'$_1$), and gives a time range for a time window integration.

The synchronization detection portion existing on the layer having a layer number (1,k) (where k is a natural number) outputs the pulse output as the synchronization detection signal to the neuron of the feature detection layer (having the layer number (1,k)), whereby the feature detection layer neuron gives a timing signal for generating the time window when the feature detection layer neuron adds the inputs in time aspect. A start time of this time window serves as a reference time for measuring an arrival time of the pulse outputted from each feature integration cell. Namely, the synchronization detection portion gives the timing for outputting the pulse from the feature integration layer neuron, and a reference pulse for a time window integration in the feature detection cell.

Each pulse is given a predetermined quantity of phase delay when passing via the synaptic circuit, and arrives at the feature detection cell further via the signal transmission line such as the common bus. A sequence of the pulse train on the time-base at this time is expressed such as pulses (P1, P2, P3) drawn by the dotted lines on the time-base of the feature detection cell.

In the feature detection cell, if larger than the threshold value as a result of the time window integration (normally the integration is effected once; there may also be, however, executed the electric charge accumulation involving the time window integration effected multiple times or the averaging process involving the time window integration effected multiple times) of the respective pulses (P1, P2, P3), a pulse output (Pd) is outputted based on a termination time of the time window. Note that the in-learning time window shown in the same Figure is what is referred to when executing the learning algorithm (or rule) that will hereinafter be discussed.

Subsequently, when the feature detection layer neuron completes, as described above, the implementation of the arithmetic behavior that will be explained below, the switch 1 is switched back again downward, and the output of the feature integration layer neuron is inputted to the feature detection layer neuron via the amplifier.

Further, at the same time, the switch 2 is switched back again upward, and the output of the feature detection layer neuron is inputted to the feature integration layer neuron.

Namely, this behavior implies that the function of the feature detection layer neuron is switched over to the phase synchronization signal generation circuit.

Note that according to the first embodiment the switching behaviors of the switches 1, 2 are herein actualized by setting beforehand so that the switch control signal is outputted from the switch control signal generation circuit after an elapse of a predetermined time since the switching behavior of the last time.

Moreover, the behaviors of the switches 1, 2 herein can be also performed by use of other control portions, however, this is not related to the essential point of the present invention, and therefore its explanation is omitted.

FIG. 16 shows pulse output timings of the respective neurons corresponding to those in FIG. 15A with respect to the processes discussed so far.

Referring to FIG. 16, when the feature integration layer neurons (N$_{11}$ through N$_{61}$) fire due to the outputs of the feature detection layer neurons of the anterior layer and perform outputting, the phase synchronization signals are outputted from the phase synchronization signal generation circuits. The feature integration layer neuron to which the phase synchronization signal has been inputted undergoes the phase synchronization process described above, and the phase synchronization detection portion detects the phase synchronization of the outputs within the phase synchronization detection window.

When the phase synchronization detection portion detects the phase synchronization of the outputs of the feature integration layer neurons, the synchronization detection signals are outputted to the feature detection layer neurons (N'$_{2D}$ through N'$_{3D}$)

As a result, the feature detection layer neuron executes the arithmetic process based on the time window and outputs corresponding to a result of this arithmetic process.

As discussed above, the function of the phase synchronization signal generation circuit and the function of the feature detection layer neuron are switched over by the switching behavior, whereby it is feasible to make compatible both the establishment of the phase synchronization of the outputs with the stability without any contradiction and downsizing of the circuit.

Spatiotemporal Integration of Pulse Outputs and Network Characteristic

Next, an arithmetic process of satiotemporal weighting summation (a load summation) of the input pulses will be explained.

As shown in FIG. 7B, each neuron takes a load summation of the input pulses by use of a predetermined weighting function (e.g., Gaussian function) for every sub time window (timeslot), and the summation of loads is compared with a threshold value. The symbol $\tau_j$ represents a central position of the weighting function of a sub time window j, and is expressed by a start time reference (an elapse time since the start time) of the time window. The weighting function is generally a function of a distance (a deviation on the time-base) from a predetermined central position (representing a pulse arrival time in the case of detecting a detection target feature), and assumes a symmetry. Accordingly, supposing that the central position $\tau_j$ of the weighting function of each sub time window (timeslot)$_j$ of the neuron corresponds to a time delay after learning between the neurons, a neural network for obtaining the spatiotemporal weighting summation (the load summation) of the input pulses can be defined as one category of a radial basis function network (which will hereinafter be abbreviated to RBF) in the time-base domain. A time window FT$_i$ of the neuron ni using Gaussian function as a weighting function is given by:

$$F_{Ti} = \sum_j^N b_{ij}\delta(t - \tau_{ij})\exp\left(-\frac{(t-\tau_{ij})^2}{\sigma_{ij}^2}\right) \quad (1)$$

Where σ is a spread with respect to every sub time window, and b$_{ij}$ is a coefficient factor.

Note that the weighting function may take a negative value. For example, if a certain feature detection layer neuron is to detect eventually a triangle and when detecting a feature (F$_{faulse}$) that is not apparently an element configuring this graphic pattern, a connection from the feature detection (integration) cell and a weighting function making a negative contribution can be given from pulses corresponding to the concerned feature ($F_{faulse}$) in the summation value calculation process of the input so that the detection of the triangle is not eventually outputted even if there is a large contribution from other feature elements.

A spatiotemporal summation $X_i(t)$ of the input signals to the neurons $n_i$ of the feature detection layer is given by:

$$X_i(t) = \sum_j S_{ij} F_{Ti}(t) Y_j(t - \tau_{ij} - \varepsilon_j) \quad (2)$$

Where $\varepsilon_j$ is an initial phase of the output pulse from the neuron $n_j$. If converged at 0 due to synchronization firing with the neuron $n_i$, $\varepsilon_j$ may be set to 0 at all times. When obtaining the load summation on the basis of the pulse input in FIG. 7A and the weighting function shown in FIG. 7B, a time-varying transition of the load summation value as shown in FIG. 7E is obtained. The feature detection layer neuron outputs the pulse when this load summation value reaches a threshold value (Vt).

The output pulse signal from the neuron ni is, as explained above, outputted to the neuron of the high-order layer with a time delay (phase) given by learning at such an output level as to become a squashing nonlinear function of the spatiotemporal summation (a so-called input summation) of the input signals (wherein the pulse output takes a fixed frequency (binary) and is outputted in a way that adds a phase modulation quantity serving as the squashing nonlinear function with respect to the spatiotemporal summation of the input signals to a phase corresponding to a fixed delay quantity determined by learning).

Process on Feature Detection Layer

Processes (for learning and recognition) executed mainly on the feature detection layer will hereinafter be described. Each feature detection layer inputs the pulse signals with respect to a plurality of different features from the same receptive field within the processing channel set at every scale level as explained above, and calculates the spatiotemporal weighting summation (the load summation) and implements a threshold process. The pulse corresponding to each feature amount arrives at a predetermined time interval, depending on a delay quantity (phase) predetermined by learning.

Learning control of this pulse arrival time patter is not essential to the first embodiment and is not therefore explained in depth. For instance, however, to be brief, the pulse corresponding to the feature element among the plurality of future elements configuring a certain graphic patter, if most contributory to detecting this pattern, arrives earlier, and, between the feature elements showing, if intact, substantially the same pulse arrival time, there is introduced a competitive learning scheme that the pulses arrive away by a fixed quantity in time from each other. Alternatively, there may be taken such a scheme that the pulses arrive at time intervals different between predetermined feature elements (configuring a recognition object and conceived important in particular such as a feature exhibiting a large mean curvature, a feature exhibiting a high rectilinearity and so forth).

According to the first embodiment, each of the neurons corresponding to the respective low-order feature elements within the same receptive field on a certain feature integration layer defined as a anterior layer, synchronously fires (pulse output) in a predetermined phase. Generally, there exist the connections to the feature detection neurons, defined as the neurons of the feature integration layer, for detecting, though different in their positions, the same high-order feature (in this case, there are the connections, configuring, though difference in their receptive fields, the same high-order feature). At this time, as a matter of course, the synchronous firing occurs also among these feature detection neurons. Further, in each of the neurons on the feature detection layer, the spatiotemporal weighting summation (the load summation) of the input pulses is calculated only in the time window having a predetermined width with respect to the pulse train arriving at the neuron. A module for actualizing the weighting addition within the time window is not limited to the neuron element circuit shown in FIGS. 2A to 2C and may be, as a matter of course, actualized otherwise.

This time window corresponds more or less to a time zone excluding the refractory period of the neuron. Namely, there is no output from the neuron even by receiving whatever input during the refractory period (a time range other than the time window), however, the behavior that the neuron fires corresponding to the input level in the time window excluding the time range, is similar to that of the actual biological neuron. The refractory period shown in FIG. 3B is a time zone from immediate after the firing of the feature detection cell to a start time of the next time window. A length of the refractory period and a width of the time window can be, of course, arbitrarily set, and the refractory period may not be set shorter than the time window as shown in FIG. 3B.

According to the first embodiment, the already-explained mechanism is that the start timing described above is made common by means of inputting the synchronization detection signals by the phase detection portion receiving the inputs from the same receptive field with respect to, for example, every feature detection layer neuron.

If configured in this fashion, the synchronization control (even if necessary) of the time window does not need effecting throughout the network, and, even when the timing signal fluctuates as described above, the reliability of detecting the feature is not degraded because of receiving uniformly an influence of the output from the same local receptive field (the on-the-time-base positional fluctuation of the window function becomes the same among the neurons forming the same receptive field). A tolerance of scatter in circuit element parameter also increases in order for the local circuit control to enable the synchronization behavior with a reliability to be attained.

For simplicity, the feature detection neuron for detecting the triangle as a feature will be described. It is assumed that the feature integration layer anterior thereto reacts to a graphical feature (feature elements) such as L-shaped patterns ($f_{11}$, $f_{12}$, ... ) having multiple directions, combinational patterns ($f_{21}$, $f_{22}$, ... ) of line segments each having a continuity (connectivity) to the L-shaped pattern and combinations ($f_{31}$, ... ) of a part of two sides configuring the triangle as depicted in FIG. 7C.

Figure 7C:
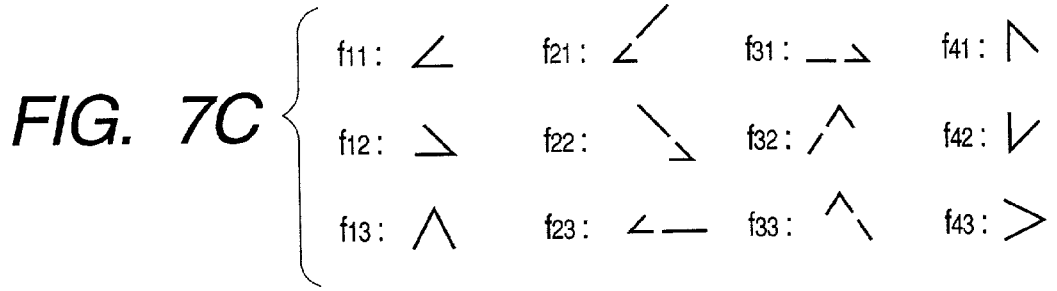

Further, $f_{41}$, $f_{42}$, $f_{43}$ shown in FIG. 7C represent features shaping the triangles having different directions and corresponding to $f_{11}$, $f_{12}$, $f_{13}$. The intrinsic delay quantity is set between the neurons forming the inter-layer connection by learning, and, as a result of this, in the triangle feature detection neuron, the pulses corresponding the principal and different features shaping the triangle are set beforehand to arrive at respective sub time windows (timeslots) ($w_1$, $w_2$, ... ) into which the time window is divided.

For instance, the pulses corresponding to combinations of the feature sets each shaping the triangle on the whole as shown in FIG. 7A, arrive first at the sub time windows $w_1$, $w_2, \ldots, w_n$ into which the time window is divided by "n". Herein, the delay quantities are set by learning so that the L-shaped patterns ($f_{11}, f_{12}, f_{13}$) arrive at within $w_1, w_2, w_3$, respectively, and the pulses corresponding to the feature elements($f_{21}, f_{22}, f_{23}$) arrive at within $w_1, w_2, w_3$, respectively.

The pulses corresponding to the feature elements ($f_{31}, f_{32}, f_{33}$) arrive in the same sequence. In the case shown in FIG. 7A, the pulse corresponding to one feature element arrive at the single sub time window (timeslot). The division into the sub time windows has such a significance that an integration mode when integrating those features, e.g., a processing mode such as setting a condition that all the feature elements be detected or a condition that a given proportion of features be detected and so on, is to be enhanced in its changeability and adaptability by individually surely detecting the pulses (detection of the feature elements) corresponding to the different feature elements developed and expressed on the time-base in the restive sub time windows.

For instance, under conditions where the recognition (detection) object is a face and a search (detection) for an eye defined as one of parts configuring the face is important (a case where the priority of detecting the eye's pattern is set high in the visual search), a reaction selectivity ((a detection sensitivity to a specified feature) corresponding to a feature element patter selectively configuring the eye can be enhanced by introducing a feedback connection from a high-order feature detection layer. This scheme makes it possible to detect the feature in a way that gives a higher importance to a lower-order feature element shaping a high-order feature element (pattern).

Further, assuming that the pulse corresponding to a more importance feature is set previously to arrive at the earlier sub time window, the feature exhibiting the higher importance is easier to detect by setting a weighting function value in the concerned sub time window larger than values in other sub time windows. This importance (the detection priority among the features) is acquired by learning or may also be predefined.

Accordingly, if on condition that there occurs an event such as detecting a given proportion of feature elements, the division into the sub time windows comes to have almost no meaning, and the processing may be implemented in one single time window.

Figure 7D:
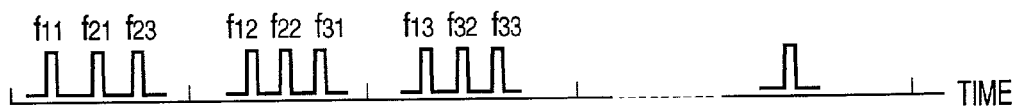
Figure 7E:
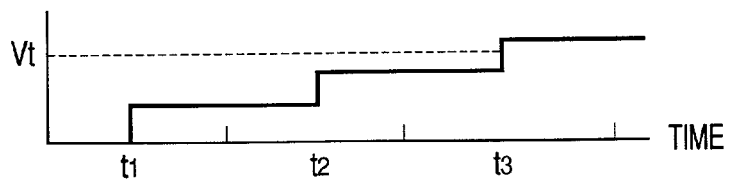

Note that the pulses corresponding to the plurality (three) of different feature elements arrive respectively and may also be added (FIG. 7D). Namely, it may be based on a premise that the pulses corresponding to the plurality of feature elements (FIG. 7D) or an arbitrary number of feature elements, be inputted to one single sub time window (timeslot). In this case, referring to FIG. 7D, the pulses corresponding to other feature elements $f_{21}, f_{23}$ supporting the detection of an apex angle portion $f_{11}$ of the triangle, arrive at the first sub time window. Similarly, the pulses corresponding to other feature elements $f_{22}, f_{31}$ supporting the detection of an apex angle portion $f_{12}$ arrive at the second sub time window.

Note that the number of divisions into the sub time windows (timeslots), the width of each sub time window (timeslot), the feature class, and the allocation of the time intervals of the pulses corresponding to the feature elements, are not limited to those described above and can be, as a matter of course, changed.

Applied Example of Installing into Photographic Device and Others

Figure 12:
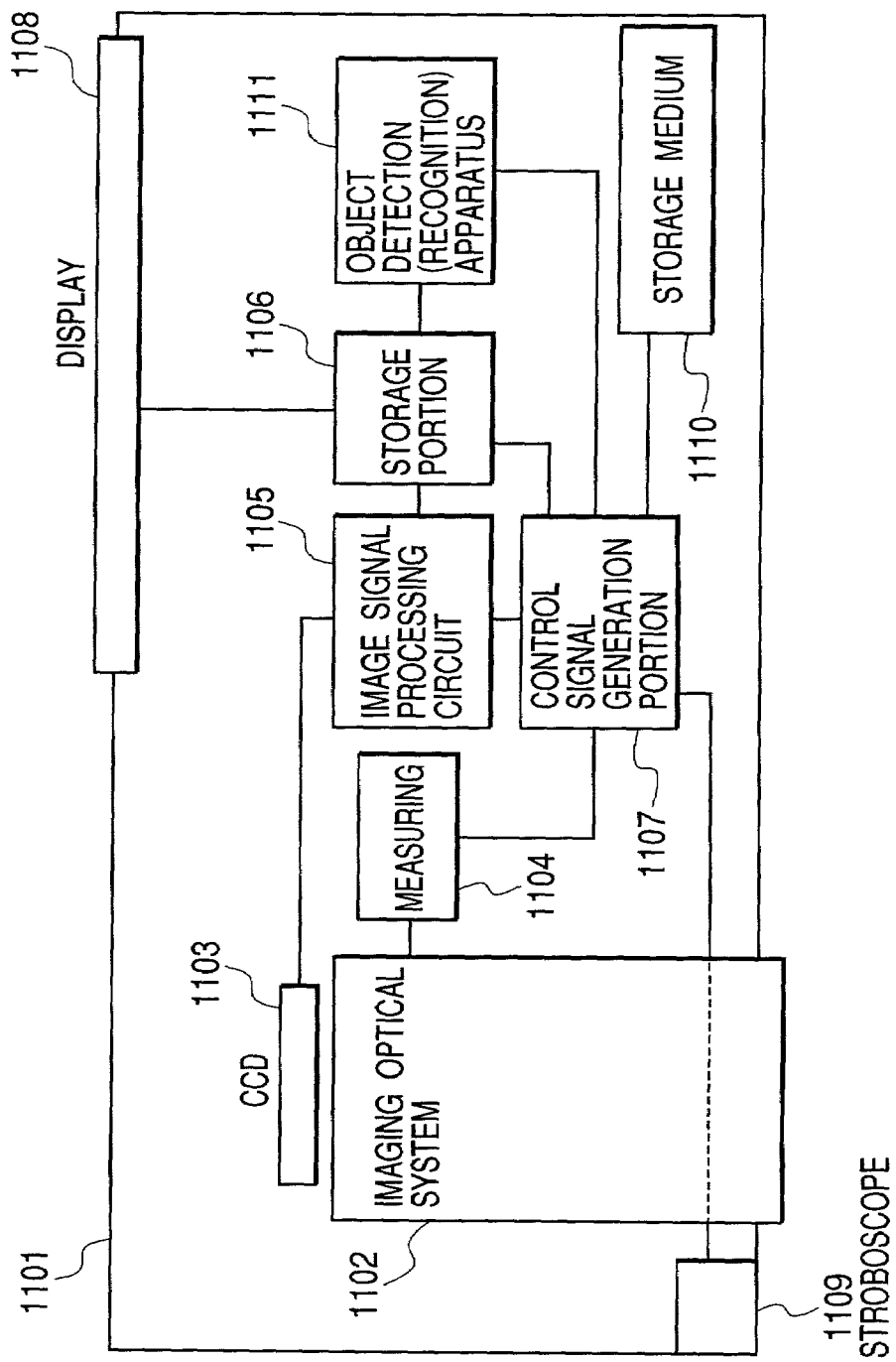
FIG. 12 is a diagram showing an example of an architecture of a photographic system incorporating a pattern recognition system.

The pattern recognition (detection) system having the architecture in the first embodiment is installed into a photographic system, wherein focusing on a specified object, a color correction of the specified object and exposure control are carried out. This case will be explained referring to FIG. 12. FIG. 12 is a diagram showing an architecture in an example where the pattern detection (recognition) system according to the first embodiment is utilized for the photographic system.

Referring to FIG. 12, a photographic system 1101 includes an imaging optical system 1102 containing a photographic lens and a drive control mechanism for zoom photography, a CCD or CMOS image sensor 1103, an imaging parameter measuring portion 1104, an image signal processing circuit 1105, a storage portion 1106, a control signal generation portion 1107 for generating control signals for control of imaging conditions, a display 1108 serving as a viewfinder such as EVF etc, a stroboscope light emitting portion 1109 and a storage medium 1110. Further, the photographic system 1101 further includes the pattern detection system described above as an object detection (recognition) system 111.

The object detection (recognition) system 111 in this photographic system 1101 detects (an existing position and a size of), for example, a face image of a pre-registered figure from within a picture photographed. Then, when the position of this figure and a piece of size data are inputted to the control signal generation portion 1107 from the object detection (recognition) system 111, the control signal generation portion 1107 generates, based on an output from the imaging parameter measuring portion 1104, control signals for optimally controlling a focus on this figure, exposure conditions, a white balance and so on.

The pattern detection (recognition) system described above is thus utilized for the photographic system, as a result of which the detection of the figure etc and the optimal photographic control (AF, AE etc) based on this detection can be attained by actualizing the function of surely detecting (recognizing) the object with a low consumption of electricity and at a high speed (in real time).

(Second Embodiment)

A second embodiment is different from the first embodiment with respect to only the items of the behavioral principles of the pattern detection and the phase synchronization.

This being the case, the discussion in the second embodiment will be focused on the these items, and other functions and behaviors are all the same as those in the first embodiment, of which the repetitive explanations are omitted.

Figure 6:
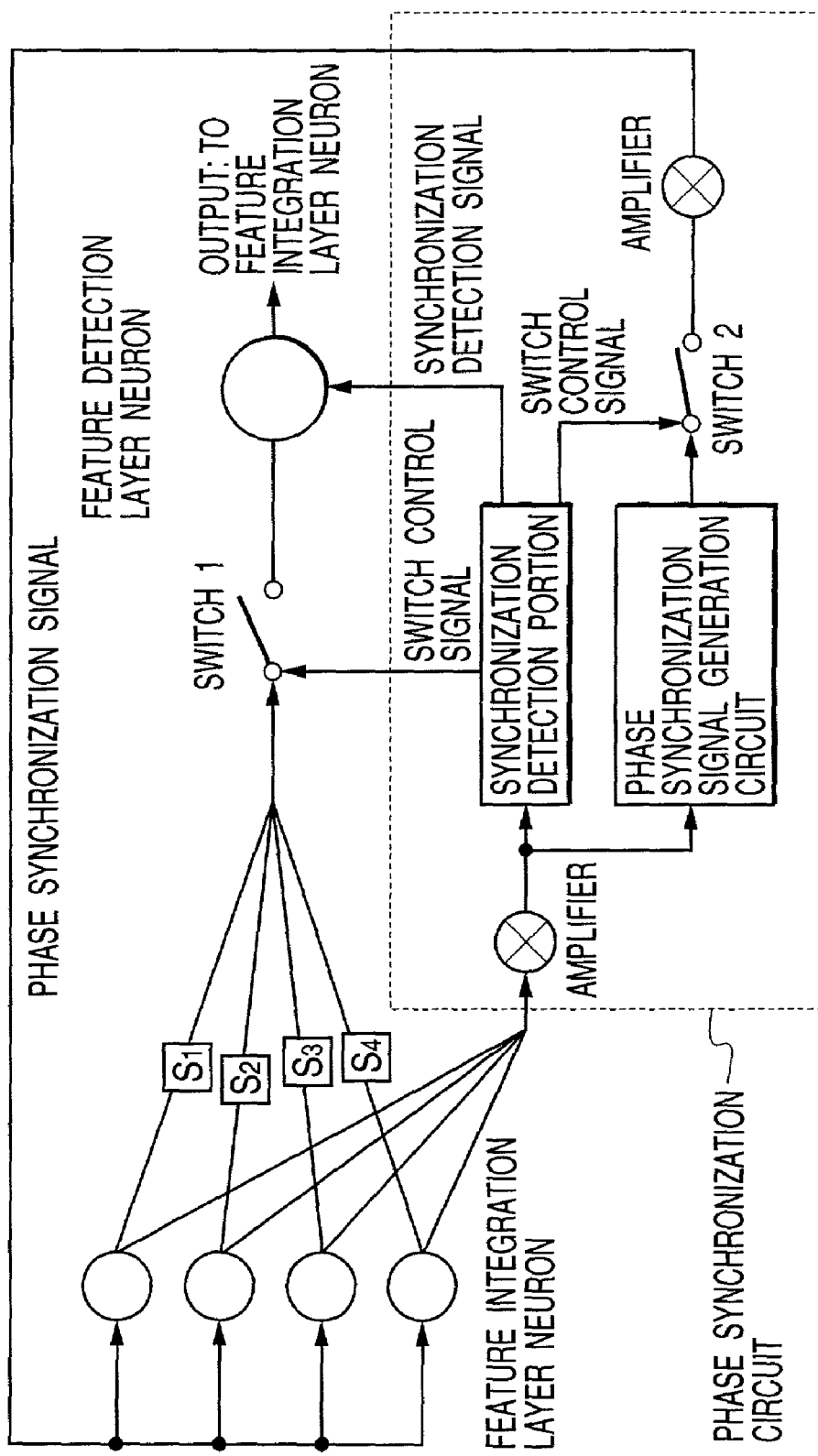
FIG. 6 is a schematic diagram showing an example of a topology in a phase synchronization circuit in a second embodiment.

To start with, the phase synchronization circuit in the second embodiment includes, as depicted in FIG. 6, the synchronization detection portion, to which the output signals from the feature integration layer neurons are inputted, for detecting the phase synchronization of the output signals, controlling the switches 1, 2 and outputting the synchronization detection signal, and the phase synchronization signal generation circuit interconnected with the feature integration layer neuron.

A processing flow in this architecture will be explained in sequence.

To begin with, when the feature integration layer neuron fires and performs outputting upon receiving an output from the anterior layer, the output signal thereof is inputted via the amplifier to the phase synchronization signal generation circuit in the phase synchronization circuit.

Figure 14C:
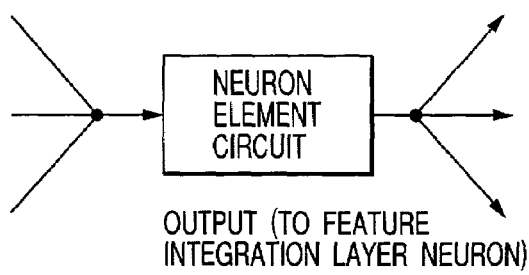

The phase synchronization signal generation circuit is, as shown in FIG. 14C, constructed of the neuron element circuit and, upon receiving even one input, outputs the phase synchronization signal to the feature integration layer neuron (at this point of time, the switch 2 in FIG. 2A is kept in the conductive state).

Herein, it is assumed that the threshold value characteristic of the phase synchronization signal generation circuit takes a predetermined value, and the output from the feature integration layer neuron is temporarily transmitted through the amplifier and amplified therein so that the phase synchronization signal generation circuit can fire with one single pulse.

Subsequently, the phase synchronization signal outputted by firing of the phase synchronization signal generation circuit is inputted to the feature integration layer neuron, however, a level of the phase synchronization signal received finally by the feature integration layer neuron is herein set so that the output pulse of the phase synchronization signal generation circuit is inputted to the amplifier to amplify the signal level, and an internal potential of the feature integration layer neuron can reach a threshold value within an allowable phase difference.

Herein, the allowable phase difference corresponds to a phase synchronization detection window width in FIG. 16, and, as will be mentioned below, the phase synchronization detection portion detects the phase synchronization with the aid of an integrated value of the output signal from the feature integration layer, which has been inputted inside the phase synchronization detection window.

The feature integration layer neuron, upon receiving a phase synchronization pulse signal, except for a certain instance just during a refractory period, exceeds a firing threshold level due to the phase synchronization pulse signal in whatever internal condition.

Herein, as shown in FIG. 15B, a minute difference between firing phases of the feature integration layer neurons, occurs depending on a difference between the internal conditions of the respective feature integration layer neurons just when the phase synchronization pulse signal is inputted. As explained above, however, since the phase synchronization signal level is set so that the phase difference is under the allowable phase difference, the outputs of the respective feature integration layer neurons to which the phase synchronization signals are inputted for a time excluding the refractory period, with the phase difference falling within the allowable phase difference, come to a synchronizing state.

Then, further the feature integration neuron staying in the refractory period in the behavior described above repeats the behavior described above till the same neuron receives the phase synchronization signal at a timing other than the refractory period and fires, whereby the synchronization of the outputs of all the feature integration layer neurons can be eventually taken.

The subsequent discussion will be focused on the phase synchronization detection portion for detecting the phase synchronization state explained above.

As shown in FIG. 6, the phase synchronization detection portion receives, as an input signal, the output of the feature integration layer neuron.

Herein, as shown in FIGS. 14A and 14C, the phase synchronization detection portion has the same architecture as that of the feature integration layer neuron that has been touched in the discussion on the neuron elements, and fires and outputs if an integrated value of input values within the phase synchronization detection windows each having a predetermined time determined by the phase synchronization detection window generation circuit, exceeds a threshold value.

Accordingly, the time width of this phase synchronization detection window is set to the allowable phase difference in the case where the feature integration layer neuron phase-synchronizes, and further a firing threshold value is set to an integrated value of the outputs of all the feature integration layer neurons to be connected, whereby the phase synchronization of the feature integration layer neuron can be detected.

Namely, as depicted in FIG. 16, the allowable phase difference is set as the phase synchronization detection window, and, when the outputs of all the feature integration layer neurons are synchronized, the neuron element circuit in the phase synchronization detection portion fires as the input integrated value in the phase synchronization detection window reaches the threshold value. As a consequence, the synchronous firing of the feature integration layer neuron can be therefore detected.

Next, a behavior after detecting the phase synchronization will be discussed.

As shown in FIG. 14A, the phase synchronization detection portion includes a switch control signal generation circuit that generates a switch control signal in accordance with the output of the neuron element circuit, and a synchronization detection signal generation circuit generating a synchronization detection signal in accordance with the above output.

The phase synchronization detection portion, when detecting the phase synchronization of the feature integration layer neuron due to firing of the neuron element circuit as described above, outputs the switch control signal from the switch control signal generation circuit receiving the output of the neuron element circuit, thereby switching over the switch 1 to a cut-off state (the conductive state continues till the phase synchronization is detected), and stops the output of the phase synchronization signal to the feature integration layer neuron from the phase synchronization signal generation circuit.

Then, at the same time the switch 1 is switched over to the conductive state (the cut-off state continues till the phase synchronization is detected), whereby the output of the feature integration layer neuron is, after undergoing the processes in the synaptic circuits $S_1$ through $S_4$ in FIG. 6, inputted to the feature detection layer neuron.

Herein, the output signal of the feature integration layer neuron that is to be inputted to the feature detection layer neuron becomes, as the input of the phase synchronization signal to the feature integration layer neuron is stopped by the above switching behavior described above, an output signal based on firing that genuinely corresponds to the input from the layer anterior to the feature integration layer neuron.

Moreover, the phase synchronization detection portion outputs the synchronization detection signal to the feature detection layer neuron from the synchronization detection signal generation circuit receiving the output of the neuron element circuit, and gives a reference time for a generation timing of the time window that will be explained below.

In this case, a time required till the output from the feature integration layer arrives at the feature detection layer, is calculated beforehand, thereby making it possible to properly establish a relationship between the synchronization detection signal and the generation timing of the time window.

According to the second embodiment, the synchronization detection signal is set as the pulse-shaped signal, and the point of time when this pulse signal is inputted to the feature detection layer neuron, is set as the beginning of the time window.

Note that the integration layer neuron corresponding to the duplex receptive field portion, in the process of executing the phase synchronization process explained above, receives the inputs of a plurality of different phase synchronization signals however, if the integration layer neuron corresponding to the duplex receptive field portion fires even once due to any one of the input from the anterior layer and the input from the phase synchronization circuit, the output pulse thereof is inputted to the plurality of phase synchronization circuits, and hence the phases of the plurality of phase synchronization signals are also synchronized at that point of time.

Accordingly, it follows that the plurality of phase synchronization signals are inputted, in a state of their phases being synchronized, to the feature integration layer neurons corresponding to the subsequent duplex receptive field portions, and the process of establishing the phase synchronization of the feature integration layer neuron takes the same course as in the case based on the single phase synchronization signal described above.

Thus, even when the feature integration layer neuron corresponding to the duplex receptive field portion receives the inputs of the plurality of phase synchronization signals, the phase synchronization of the outputs can be established with a stability without any contradiction.

Further, particularly in the phase synchronization signal generation circuit, if a time interval till the phase synchronization signal is outputted since the signal has been inputted, is set equal to or longer than the refractory period of the feature integration layer neuron, the feature integration layer neuron that did not fire because of the phase synchronization signal being inputted during the refractory period, becomes capable of firing and outputting in a way that phase-synchronizes with other feature integration layer neurons when inputting the next phase synchronization signal, whereby the time up to the phase synchronization can be reduced.

An arithmetic behavior of the feature detection layer neuron after the phase synchronization of the output of the feature integration layer neuron has been detected, will be explained in succession.

When the synchronization detection signal is inputted to the feature detection layer neuron from the phase synchronization detection portion, as described above, the time window occurs due to the synchronization detection signal.

Herein, the time window, which is determined for every feature detection layer neuron ($n'_i$), is common to the respective neurons within the feature integration layer forming the same receptive field with respect to the neuron ($n'_i$), and gives a time range for a time window integration.

The synchronization detection portion existing on the layer having a layer number (1,k) (where k is a natural number) outputs the pulse output as the synchronization detection signal to the neuron of the feature detection layer (having the layer number (1,k)), whereby the feature detection layer neuron gives a timing signal for generating the time window when the feature detection layer neuron adds the inputs in time aspect. A start time of this time window serves as a reference time for measuring an arrival time of the pulse outputted from each feature integration cell. Namely, the synchronization detection portion gives the timing for outputting the pulse from the feature integration layer neuron, and a reference pulse for a time window integration in the feature detection cell.

Each pulse is given a predetermined quantity of phase delay when passing via the synaptic circuit, and arrives at the feature detection cell further via the signal transmission line such as the common bus. A sequence of the pulse train on the time-base at this time is expressed such as pulses ($P_1$, $P_2$, $P_3$) drawn by the dotted lines on the time-base of the feature detection cell.

In the feature detection cell, if larger than the threshold value as a result of the time window integration (normally the integration is effected once; there may also be, however, executed the electric charge accumulation involving the time window integration effected multiple times or the averaging process involving the time window integration effected multiple times) of the respective pulses ($P_1$, $P_2$, $P_3$), a pulse output ($P_d$) is outputted based on a termination time of the time window. Note that the in-learning time window shown in the same Figure is what is referred to when executing the learning algorithm that will hereinafter be discussed.

Subsequently, when the feature detection layer neuron completes, as described above, the implementation of the arithmetic behavior that will be explained below, the switch 2 reverts again to the conductive state, and the output of the phase synchronization signal generation circuit is inputted to the feature integration layer neuron via the amplifier.

Further, the switch 1 reverts again to the cut-off state, and the input to the feature detection layer neuron from the feature integration layer neuron is stopped.

Note that according to the second embodiment the switching behaviors of the switches 1, 2 are herein actualized by setting beforehand so that the switch control signal is outputted from the switch control signal generation circuit after an elapse of a predetermined time since the switching behavior of the last time.

Moreover, the behaviors of the switches 1, 2 herein can be also performed by use of other control portions, however, this is not related to the essential point of the present invention, and therefore its explanation is omitted.

As discussed above, the signal level of the phase synchronization signal outputted from the phase synchronization circuit is set so that the feature integration layer neuron fires within the allowable phase difference, whereby the phase synchronization of the feature integration layer neuron can be established in a shorter time.

(Third Embodiment)

Figure 8:
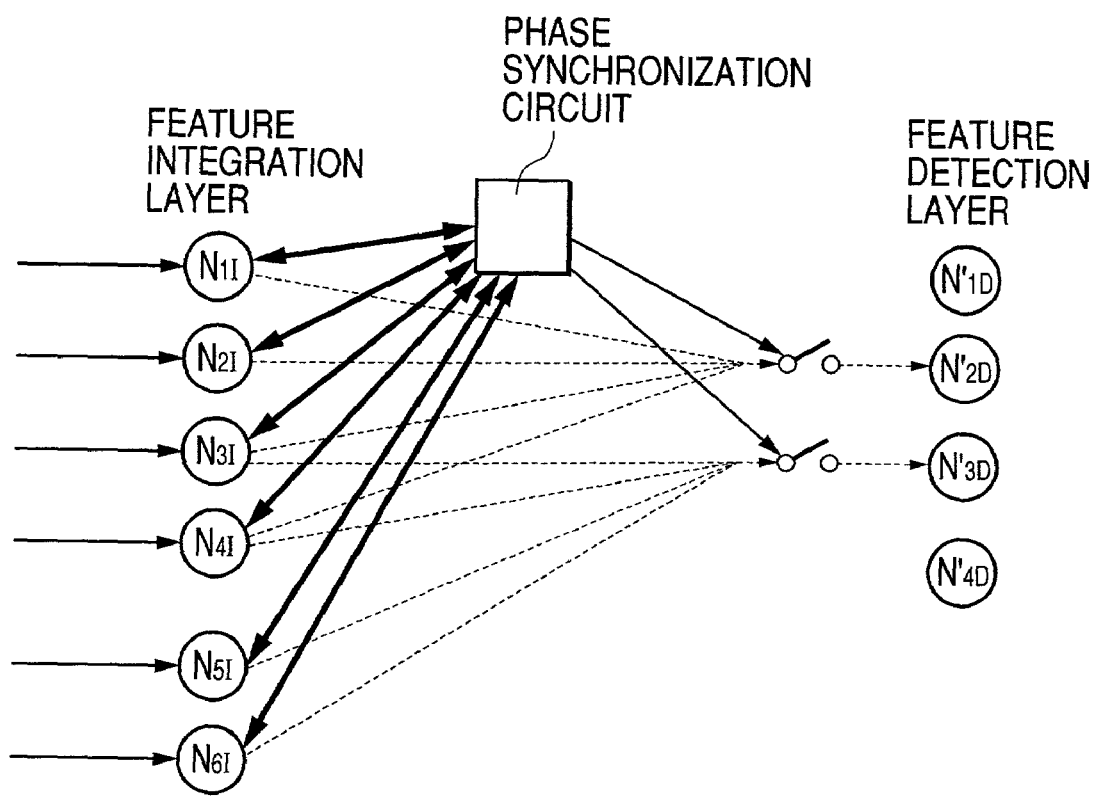
FIG. 8 is a schematic diagram showing a topology in a case where a phase synchronization circuit according to a third embodiment is centered.

FIG. 8 shows an example of topology of how other neurons (the neuron groups of the feature and detection layers) are connected to the phase synchronization circuit as well as showing the phase synchronization circuit itself (wherein the input to the feature integration layer neuron from the anterior layer is indicated by a fine line, the input to the feature detection layer neuron from the feature integration layer neuron is drawn by a dotted line, the interconnection between the feature integration layer and the phase synchronization circuit is indicated by a bold line, the switch control signal is indicated by a fine line, and the synaptic circuit and the synchronization detection signal are omitted).

An architecture different from the second embodiment is that one phase synchronization circuit exists for every group formed by clustering the feature detection layer neurons detecting the same feature category by a predetermined number, and generates an independent phase synchronization signal.

With this architecture adopted, the duplex receptive field structure with respect to the feature integration layer between the adjacent feature detection layer neurons can be eliminated (the feature integration layer neuron receives only the phase synchronization signal from the one single phase synchronization circuit), and it is feasible to decrease the number of the phase synchronization circuits and the number of the phase synchronization detection portions.

According to the third embodiment, the synchronization detection signal of the phase synchronization circuit is, when the synchronization detection portion detects the synchronization firing of the feature integration layer neuron, generated independently of other phase synchronization circuits.

Figure 9:
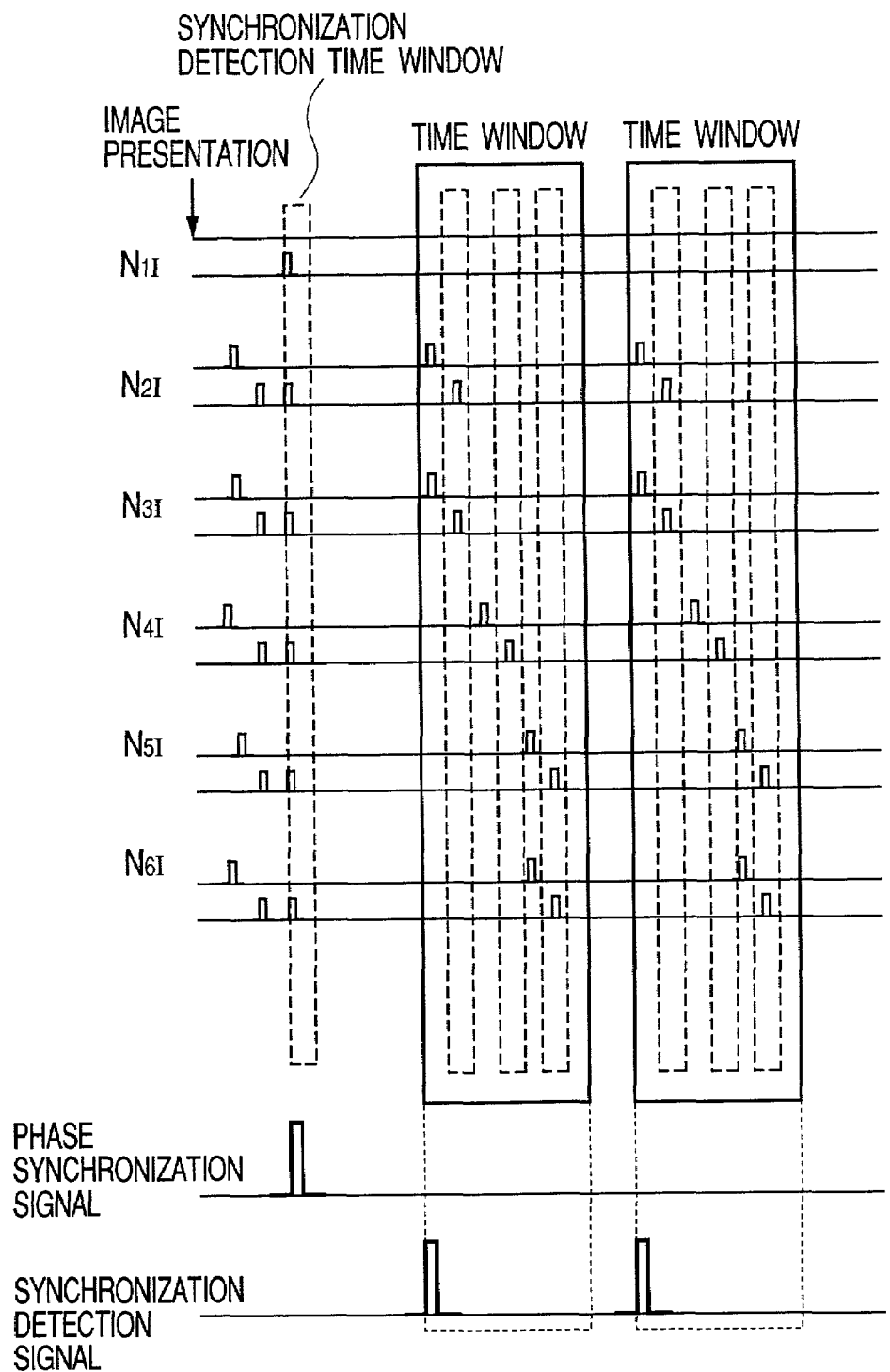
FIG. 9 is a graph showing pulse firing timings of the respective neurons.

FIG. 8 shows the processing flow described above. FIG. 9 shows pulse output timings of the respective corresponding neurons.

Referring to FIG. 9, when the feature integration layer neurons ($N_{11}$ through $N_{61}$) fire and output upon outputs of the feature detection neurons of the anterior layer, the phase synchronization signal is outputted from the phase synchronization signal generation circuit. The feature integration layer neuron to which the phase synchronization signal has been inputted undergoes the phase synchronization process described above, and the phase synchronization detection portion detects the phase synchronization of the output within the phase synchronization detection window.

When the phase synchronization of the output of the feature integration layer neuron is detected by the phase synchronization portion, the phase synchronization signals are outputted to the feature detection layer neurons ($N'_{2D}$ through $N'_{3D}$).

In consequence, the feature detection layer neuron, the time-widow-based arithmetic process being executed, outputs corresponding to a result of this arithmetic process.

Herein, the output of the phase synchronization signal generation circuit is given independently of other phase synchronization circuits when the time integrated value of the input pulses within the phase synchronization detection time window (shown in FIG. 9).

As explained above, the architecture is that the single phase synchronization circuit exists for every group formed by clustering the feature detection layer neurons detecting the same feature category by the predetermined number, and generates the independent phase synchronization signal, whereby the circuit scale and the consumption of the electric power can be reduced.

(Fourth Embodiment)

Figure 10A:
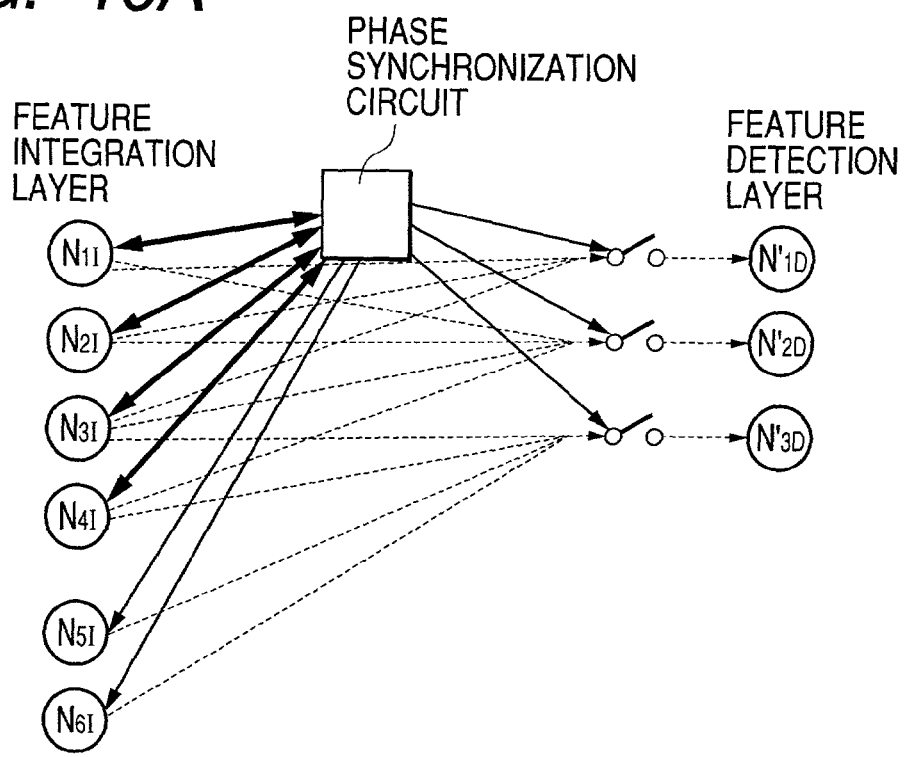
FIGS. 10A and 10B are schematic diagrams each showing a topology in a case where a phase synchronization circuit according to a fourth embodiment is centered.
Figure 10B:
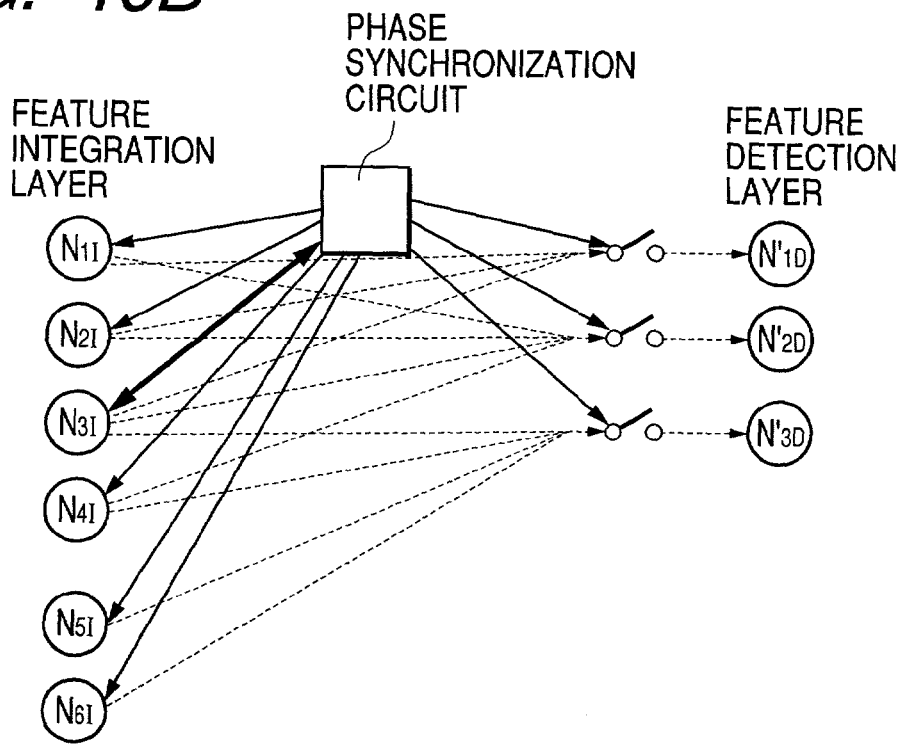

FIGS. 10A and 10B each show an example of connecting to the phase synchronization circuit as well as showing the phase synchronization circuit itself (wherein the input to the feature detection layer neuron from the feature integration layer neuron is indicated by a dotted line, the phase synchronization signal is drawn by a fine line, the interconnection between the feature integration layer and the phase synchronization circuit is depicted by a bold line, an interconnection between the feature integration layer and a WTA (Winner-Take-All) circuit is shown by a fine line, an interconnection between the phase synchronization circuit and the WTA circuit is indicated by a bold line, the switch control signal is indicated by a fine line, and the input to the feature integration layer neuron from the anterior layer, the synaptic circuit and the synchronization detection signal are omitted).

The phase synchronization circuit receives the pulse signals inputted only from the feature integration layer neurons to the neuron ($N_{31}$) existing in a centroidal position or a position most vicinal thereto as a representative position of the feature detection layer neuron group formed by clustering the neurons in the same way as in third embodiment, and generates the phase synchronization signal under a predetermined condition.

Referring to FIG. 10A, a neuron existing in a centroidal position of the feature detection layer neuron group connected to the phase synchronization circuit, is $N'_{2D}$. Feature integration layer neurons $N_{11}$, $N_{21}$, $N_{31}$, $N_{41}$ to which the neuron $N'_{2D}$ is connected are interconnected to the phase synchronization circuit (the connections are indicated by the bold lines). This topology serves to reduce the wiring needed for the interconnections as compared with the third embodiment. Further, an operational problem (such as a deviation in the time window occurrence timing between the phase synchronization circuit and feature detection layer due to asynchronous inputs of the plurality of phase synchronization signals) does not arise because of eliminating the duplex receptive field structure and using the phase synchronization circuit generating the independent phase synchronization signal even when reducing the wiring as described above.

Figure 11:
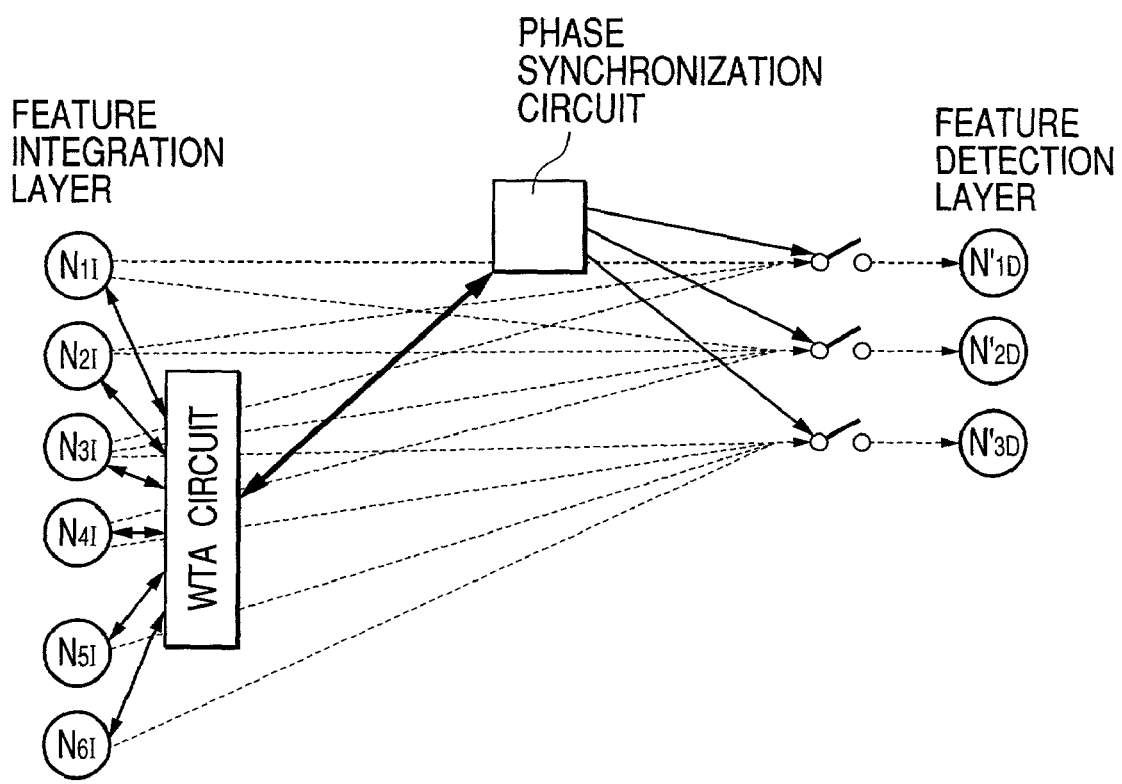
FIG. 11 is a schematic diagram showing a topology in the case where the phase synchronization circuit according to the fourth embodiment is centered.

Similarly in a topology illustrated in FIG. 10B, the neuron interconnected with the phase synchronization circuit is only one neuron ($N_{31}$), existing in the vicinity of the centroidal position, among the feature integration layer neuron group from which the neuron $N'_{2D}$ receives the inputs. This topology further reduces the wiring for the interconnections. Moreover, the phase synchronization-circuit can be also structured to receive the inputs only from the neurons performing the maximum outputs among the feature integration layer neurons that should receive the inputs in FIG. 10B. For instance, according to a topology shown in FIG. 11, a so-called Winner-Take-All (which will hereinafter be abbreviated to a WTA circuit) for detecting the maximum output is provided between the feature integration layer neuron group and the phase synchronization circuit, and the phase synchronization circuit receives an output from this WTA circuit. The feature integration layer neuron group is connected to the feature detection layer neuron group in the same way as in FIGS. 10A and 10B. Thus, the stable operation of the parallel pulse signal processing at the much smaller circuit scale can be actualized by executing the local timing control based on the outputs from the feature integration layer neurons detecting the most conspicuous feature in the local area within the predetermined range on the input (image) data.

As discussed above, the fourth embodiment exhibits such an effect that the synchronizing operation can be actualized stably without any contradiction in a way that brings about neither an increase in the circuit scale nor an increase in the consumption of electric power in the signal processing circuit.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A signal processing circuit comprising:
   a plurality of arithmetic elements connected to each other based on a predetermined rule and disposed in parallel, executing a predetermined arithmetic process with respect to input signals and outputting;
   a phase synchronization signal generation circuit outputting phase synchronization signals to said predetermined vicinal arithmetic elements; and synchronization detection means detecting synchronization within an allowable phase difference between the outputs of said predetermined vicinal arithmetic elements, wherein said phase synchronization signal generation circuit functions also as an arithmetic element executing the predetermined arithmetic process and outputting in accordance with a result of the synchronization detection by said synchronization detection means.

2. A signal processing circuit according to claim 1, wherein said phase synchronization signal generation circuit outputs the phase synchronization signals in accordance with time-series signals inputted from said predetermined vicinal arithmetic elements.

3. A signal processing circuit according to claim 1, wherein the output of said phase synchronization signal generation circuit is a pulse signal.

4. A signal processing circuit according to claim 3, wherein said predetermined vicinal arithmetic element has a refractory period, and, in said phase synchronization signal generation circuit, a time interval till the phase synchronization signal is outputted since the signal has been inputted is equal to or larger than the refractory period of said predetermined vicinal arithmetic element.

5. A signal processing circuit according to claim 1, wherein the output of each of the phase synchronization signals outputted to said predetermined vicinal arithmetic elements from said phase synchronization signal generation circuit, is so controlled as to fall within the allowable phase difference between the output signals from said predetermined vicinal arithmetic elements.

6. A signal processing circuit according to claim 5, wherein said predetermined vicinal arithmetic element has a refractory period, and a phase difference between the output signals of said predetermined vicinal arithmetic elements falls within the allowable phase difference when the phase synchronization signal is inputted other than the refractory period of said arithmetic element.

7. A signal processing circuit according to claim 1, wherein said synchronization detection means has an arithmetic element outputting in accordance with an integrated value of the input signals.

8. A signal processing circuit comprising:
a plurality of arithmetic elements connected to each other based on a predetermined rule and disposed in parallel, executing a predetermined arithmetic process with respect to input signals and outputting;

a phase synchronization signal generation circuit outputting phase synchronization signals to said predetermined vicinal arithmetic elements; and synchronization detection means detecting synchronization within an allowable phase difference between the outputs of said predetermined vicinal arithmetic elements, wherein the output of each of the phase synchronization signals outputted to said predetermined vicinal arithmetic elements from said phase synchronization signal generation circuit, is so controlled as to fall within the allowable phase difference between the output signals from said predetermined vicinal arithmetic elements.

9. A signal processing circuit according to claim 8, wherein said predetermined vicinal arithmetic element has a refractory period, and a phase difference between the output signals of said predetermined vicinal arithmetic elements falls within the allowable phase difference when the phase synchronization signal is inputted other than the refractory period of said arithmetic element.

10. A signal processing circuit according to claim 8, wherein said phase synchronization signal generation circuit outputs the phase synchronization signals in accordance with time-series signals inputted from said predetermined vicinal arithmetic elements.

11. A signal processing circuit according to claim 8, wherein said synchronization detection means is an arithmetic element outputting in accordance with an integrated value of the input signals.

12. A signal processing circuit according to claim 8, wherein the output of said phase synchronization signal generation circuit is a pulse signal.

13. A signal processing circuit according to claim 12, wherein said predetermined vicinal arithmetic element has a refractory period, and, in said phase synchronization signal generation circuit, a time interval till the phase synchronization signal is outputted since the signal has been inputted is equal to or larger than the refractory period of said predetermined vicinal arithmetic element.

* * * * *

UNITED STATES PATENT AND TRADEMARK OFFICE
CERTIFICATE OF CORRECTION

PATENT NO. : 7,007,002 B2
APPLICATION NO. : 10/153693
DATED : February 28, 2006
INVENTOR(S) : Masakazu Matsugu et al.

It is certified that error appears in the above-identified patent and that said Letters Patent is hereby corrected as shown below:

On Title Page
ITEM [30] Foreign Application Priority Data

"164284/2001" (first occurrence) should read --2001-164511--.
"164284/2001" (first occurrence) should read --2001-164284--.

ITEM [56] REFERENCES CITED

Other Publications:
After Lades: "invariant" should read --Invariant--.
After Schuster: "ISSC" should read --ISSCC--.

COLUMN 1

Line 9, "network etc" should read --network, etc.,--.
Line 22, "is" should be deleted.
Line 23, "involving" should read --involve--.
Line 26, "ing etc." should read --ing, etc.,--.
Line 49, "is" should read --are--.

COLUMN 2

Line 3, "pp. 193-204,;" should read --pp. 193-204,--.
Line 18, "Echhorn" should read --Eckhorn--.
Line 19, "linking via synchronization" should read --Linking via Synchronization--.
Line 20, "among distributed assemblies: simulation of results from cat" should read --Among Distributed Assemblies: Simulation of Results from Cat--.
Line 21, "cortex," should read --Cortex,--.
Line 26, "silicon" should read --Silicon--.
Line 27, "In" should read --in--.
Line 43, "tem etc" should read --tem, etc.,--.

COLUMN 3

Line 63, "illustrates" should read --illustrate--; and "such" should read --Such--.

COLUMN 5

Line 36, "patter" should read --pattern--.

UNITED STATES PATENT AND TRADEMARK OFFICE
CERTIFICATE OF CORRECTION

PATENT NO.       : 7,007,002 B2
APPLICATION NO.  : 10/153693
DATED            : February 28, 2006
INVENTOR(S)      : Masakazu Matsugu et al.

It is certified that error appears in the above-identified patent and that said Letters Patent is hereby corrected as shown below:

COLUMN 6

Line 29, "belong" should read --belonging--.
      Line 49, "a re arranged" should read --are arranged--.

COLUMN 7

Line 2, "or" should read --of--.
      Line 64, "transistors" should read --transistor--.

COLUMN 8

Line 8, "phase-of" should read --phase of--.
      Line 57, "function etc" should read --function, etc.,--.

COLUMN 9

Line 36, "function etc." should read --function, etc.,--.
      Line 46, "delay etc)" should read --delay, etc.)--.
      Line 61, "adopted)of" should read -- adopted) of--.

COLUMN 10

Line 26, "till" should read --until--.

COLUMN 11

Line 26, "neurons" should read --neuron--.
      Line 28, "a" should be deleted.
      Line 66, "algorithm etc," should read --algorithm, etc.,--.

COLUMN 12

Line 8, "mouth etc" should read --mouth, etc.,--.
      Line 35, "neurons" should read --neurons).--.

UNITED STATES PATENT AND TRADEMARK OFFICE
CERTIFICATE OF CORRECTION

| | |
|---|---|
| PATENT NO. | : 7,007,002 B2 |
| APPLICATION NO. | : 10/153693 |
| DATED | : February 28, 2006 |
| INVENTOR(S) | : Masakazu Matsugu et al. |

It is certified that error appears in the above-identified patent and that said Letters Patent is hereby corrected as shown below:

COLUMN 13

Line 8, "shows" should read --show--.
    Line 19, "delay etc" should read --delay, etc.,--.
    Line 28, "cells" should read --cell--.
    Line 65, "till" should read --until--.

COLUMN 14

Line 1, "till" should read --until--.
    Line 56, "till" should read --until--.

COLUMN 15

Line 44, "what" should be deleted.
    Line 45, "has undergone" should read --which has undergone-.
    Line 51, "till" should read --until--.

COLUMN 16

Line 11, "till" should read --until--.
    Line 53, "till" should read --until--.

COLUMN 18

Line 29, "satiotemporal" should read --spatiotemporal--.
    Line 51, "window $FT_i$" should read --window $F_{Ti}$--.
    Line 62, "Where" should read --where--.

COLUMN 19

Line 16, "Where $\epsilon_j$" should read --where $\epsilon_j$--.
    Line 18, "$\epsilon_j$" should read --$\varepsilon_j$--.
    Line 49, "patter" should read --pattern--.
    Line 53, "patter," should read --pattern,--.

COLUMN 20

Line 26, "immediate" should read --immediately--.

UNITED STATES PATENT AND TRADEMARK OFFICE
CERTIFICATE OF CORRECTION

| | |
|---|---|
| PATENT NO. | : 7,007,002 B2 |
| APPLICATION NO. | : 10/153693 |
| DATED | : February 28, 2006 |
| INVENTOR(S) | : Masakazu Matsugu et al. |

It is certified that error appears in the above-identified patent and that said Letters Patent is hereby corrected as shown below:

COLUMN 21

Line 27, "((a" should read --(a--.
      Line 29, "patter" should read --pattern--.

COLUMN 22

Line 20, "EVF etc," should read --EVF, etc.,--.
      Line 38, "figure etc" should read --figure, etc.,--.
      Line 39, "AE etc" should read --AE, etc.,--.

COLUMN 23

Line 52, "till" should read --until--.

COLUMN 24

Line 38, "till" should read --until--.
      Line 43, "till" should read --until--.
      Line 46, "$S_1$ through $S_4$" should read --S1 through S4--.
      Line 62, "till" should read --until--.

COLUMN 25

Line 32, "till" should read --until--.

COLUMN 29

Line 21, "till" should read --until--.
      Line 37, "inputted other" should read --inputted at other--.

UNITED STATES PATENT AND TRADEMARK OFFICE
CERTIFICATE OF CORRECTION

| | | |
|---|---|---|
| PATENT NO. | : 7,007,002 B2 | |
| APPLICATION NO. | : 10/153693 | |
| DATED | : February 28, 2006 | |
| INVENTOR(S) | : Masakazu Matsugu et al. | |

It is certified that error appears in the above-identified patent and that said Letters Patent is hereby corrected as shown below:

<u>COLUMN 30</u>

Line 22, "inputted other" should read --inputted at other--.
Line 39, "till" should read --until--.

Signed and Sealed this

Fourteenth Day of November, 2006

JON W. DUDAS
*Director of the United States Patent and Trademark Office*